United States Patent [19]

Kessler

[11] Patent Number: 4,503,288

[45] Date of Patent: Mar. 5, 1985

[54] INTELLIGENT TELEPHONE

[75] Inventor: Bayard F. Kessler, Woodland Hills, Calif.

[73] Assignee: Novation, Inc., Chatsworth, Calif.

[21] Appl. No.: 298,105

[22] Filed: Aug. 31, 1981

[51] Int. Cl.³ .................. H04M 11/00; H04M 1/274; H04M 1/65; H04M 11/04

[52] U.S. Cl. .............................. 179/2 DP; 179/2 TC; 179/5 P; 179/6.13; 179/90 BD; 179/99 P

[58] Field of Search ............ 179/2 DP, 90 B, 90 BD, 179/5 P, 6.13, 6.04, 84 T, 2 TC, 99 P, 2 A

[56] References Cited

U.S. PATENT DOCUMENTS

| | | |
|---|---|---|
| 3,301,958 | 1/1967 | Blakeslee et al. ............ 179/90 B X |
| 3,925,622 | 12/1975 | Robinson ....................... 179/5 P X |
| 3,932,709 | 1/1976 | Hoff et al. .................... 179/2 DP X |
| 3,943,288 | 3/1976 | Reed et al. ........................ 179/2 TC |
| 4,007,443 | 2/1977 | Bromberg et al. ............... 179/2 DP |
| 4,122,308 | 10/1978 | Weinberger et al. . |
| 4,209,668 | 6/1980 | Weinberger et al. ............. 179/90 B |
| 4,277,651 | 7/1981 | Fisher et al. ...................... 179/90 B |
| 4,291,198 | 9/1981 | Anderson et al. ................ 179/2 DP |
| 4,307,266 | 12/1981 | Messina ............................ 179/2 DP |
| 4,348,550 | 9/1982 | Pirz et al. ....................... 179/90 B X |
| 4,359,607 | 11/1982 | Hannig et al. ............... 179/15 M X |
| 4,371,751 | 2/1983 | Hilligoss, Jr. et al. .......... 179/5 P X |
| 4,399,331 | 8/1983 | Brown et al. ....................... 179/5 R |
| 4,404,433 | 9/1983 | Wheeler et al. . |
| 4,427,848 | 1/1984 | Tsakanikas ....................... 179/2 DP |

FOREIGN PATENT DOCUMENTS

| | | |
|---|---|---|
| 2,419,867 | 9/1975 | Fed. Rep. of Germany ... 179/2 TC |
| 2,634,445 | 2/1977 | Fed. Rep. of Germany ... 179/2 DP |
| 2844559 | 4/1980 | Fed. Rep. of Germany .... 179/90 B |
| 3010745 | 9/1981 | Fed. Rep. of Germany . |
| 52-64811 | 5/1977 | Japan ................................ 179/15 M |
| 2030423 | 4/1980 | United Kingdom .............. 179/90 B |

OTHER PUBLICATIONS

Micon Industries Manual Communications Module; (Sales Brochure) Micon Industries, Oakland, Calif., 5/21/80.
Nishiyama et al., "The Portable Data Display Terminal VC-350", National Technical Report, (Japan), vol. 19, No. 6, pp. 624-631, Dec. 1973.
Melvin, Donald K.; LSI Applications in Telephone Instruments; Proceedings of the National Electronics Conference; vol. 32, pp. 261-266, Chicago, Ill., (Oct. 16-18, 1978).

Primary Examiner—Keith E. George
Attorney, Agent, or Firm—Blakely, Sokoloff, Taylor & Zafman

[57] ABSTRACT

A microprocessor based telephone like device which includes all of the functions of any ordinary telephone, the functions of a data terminal and many additional functions to provide a highly useful voice and data communications and control device for both professional and personal use. The system generally includes a provision for direct connection and acoustic coupling to a phone line for ordinary voice communications or for data communications through a modem. A full alphanumeric keyboard coupled with a significant buffer memory and a one line display in the terminal provide for buffering of incoming and outgoing data as well as the display thereof. Inasmuch as the microprocessor based system is a bus oriented system, a great variety of controllers and communications devices and interfaces may be coupled thereto to provide a large array of data and voice communications and control capabilities.

18 Claims, 12 Drawing Figures

Fig. A

INTELLIGENT TELEPHONE

BACKGROUND OF THE INVENTION

1. Field of the Invention

The present invention relates to the field of telephone line communication devices.

2. Prior Art

Communication devices for data communication over telephone lines are well known in the prior art. Typically such devices utilize some form of modem to modulate serial digital data into the frequency pass band of telephone systems for transmission, and to demodulate a corresponding received signal for recovery of the digital data at the receiving end. Such communication capability may be in a single direction at any one time (half duplex) or may include simultaneous bidirectional capabilities (full duplex). Using such communication techniques, various devices have been coupled to telephone lines for various purposes. By way of example, modems have been used to couple personal computers through telephone lines, generally for the purpose of data communication with other similar computers. In general such devices have not included a handset for voice communication and also such systems are relatively bulky, and accordingly they are generally limited to use for point-to-point data communications. In other instances, modems have been used for data communications over telephone lines between a central computer and one or more remote terminals specially configured for such use. While such terminals may include a full keyboard for data entry purposes, and a display for displaying entered and transmitted information, such terminals are generally limited in function and purpose to data entry and communication tasks and do not themselves provide any substantial form of self control or ability to control other devices.

One form of general purpose electronic telephone station is shown in U.S. Pat. No. 4,291,198. That device or system is microprocessor based and includes a handset, a video output display screen and a full alphanumeric key set, the keys being arranged generally as a normal "qwerty" organization but in an orthogonal array rather than in a conventional typewriter keyboard layout. The microprocessor based system allows various forms of control of the station set, though as with other prior art telephone line communication devices, it too is dedicated in purpose to communication, having the added feature of voice communication capabilities. Also the system of that patent utilizes a conventional telephone handset and a cathode ray tube display, having a substantially square display area. Accordingly the system is relatively large and not suitable for use as a portable device.

BRIEF SUMMARY OF THE INVENTION

A microprocessor based telephone like device includes all of the functions of any ordinary telephone, the functions of a data terminal and many additional functions to provide a highly useful voice and data communications and control device for both professional and personal use. The system generally includes a provision for direct connection and acoustic coupling to a phone line for ordinary voice communications or for data communications through a modem. A full alphanumeric keyboard coupled with a significant buffer memory and a one line display in the terminal provide for buffering of incoming and outgoing data as well as the display thereof. Inasmuch as the microprocessor based system is a bus oriented system, a great variety of controllers and communications devices and interfaces may be coupled thereto to provide a large array of data and voice communications and control capabilities.

Since the data storage in the device is in ASCII code form, the provision of an RS-232 controller on the system bus allows communication with and/or control of any of the large variety of ASCII RS-232 devices currently available, such as printers, terminals and personal computers, either directly from the telephone like device or from a remote location through the telephone line connected to the telephone like device. Other capabilities include the direct control of printer interfaces, voice synthesis systems, tape controllers, code readers and appliance controllers. Also if desired a composite video signal may be generated to expand the display capabilities from the single line display of the telephone like device to display on a video monitor or readily available standard television receiver to conveniently provide a multiline display in a very readily portable device.

DETAILED DESCRIPTION OF THE PREFERRED EMBODIMENT

Figure 1:
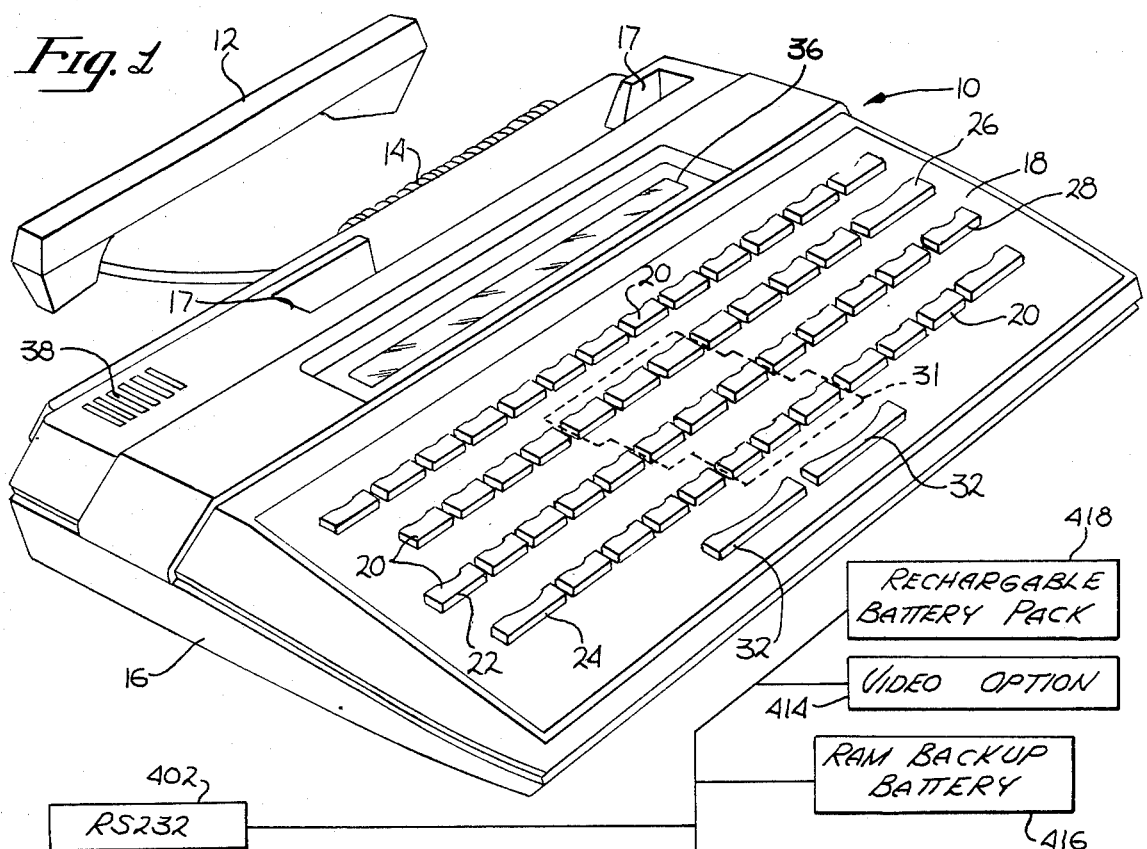
FIG. 1 is a perspective view of the preferred embodiment of the present invention.

FIG. 1 shows the keyboard terminal 10 of the present invention. A keyboard terminal 10 includes a hand set phone unit 12 which is coupled to the keyboard terminal 10 by a flexible cord 14. The hand set phone unit 12 permits use of the keyboard terminal 10 in what may be referred to as the typical "Ma-Bell" telephone operating mode. The keyboard terminal 10 has a case 16 molded as shown at 17 to accept and secure thereto the hand set phone unit 12. The keyboard 18 has a plurality of keys 20 including some specialized keys particularly suited to the application modes to be discussed below. These special keys include a control key 22, a shift key 24, a return key 26 and a rub out key 28 as well as status keys 30. While keyboard 18 has the usual numbers 0-9 located in the position as on most typewriters, a given user may prefer to have a separate set of number keys organized in the "adding machine" layout. By appropriate activation of preselected keys, "FUNC", "CNTL", and "N", a "numeric pad" 31 is formed. The numbers 7, 8 and 9 then replace the letters T, Y and U. Th letters G, H and J become the numbers 4, 5 and 6 respectively. The letters B, N and M become the numbers 1, 2 and 3 respectively. The right half of the space bar 32 can be a carriage return, and the left half becomes the zero. The case 16 also has disposed within it a display window 36 which enables the keyboard terminal 10 to display data in a visual mode on a liquid crystal display system. The case 16 is also provided with a speaker opening 38 which permits a user to hear the ringing of the telephone unit 12 or to otherwise audibly perceive the information which has been processed through a speech synthesizer so as to be audible to the operator. The keyboard terminal 10 contains within its case 16 a plurality of subsystems the orchestration of which permits the keyboard terminal 10 to perform a variety of preprogrammed functions. These subsystems are functionally illustrated in FIG. 2. The interconnection of these subsystems is shown in FIGS. 9 through 12.

Figure 2:
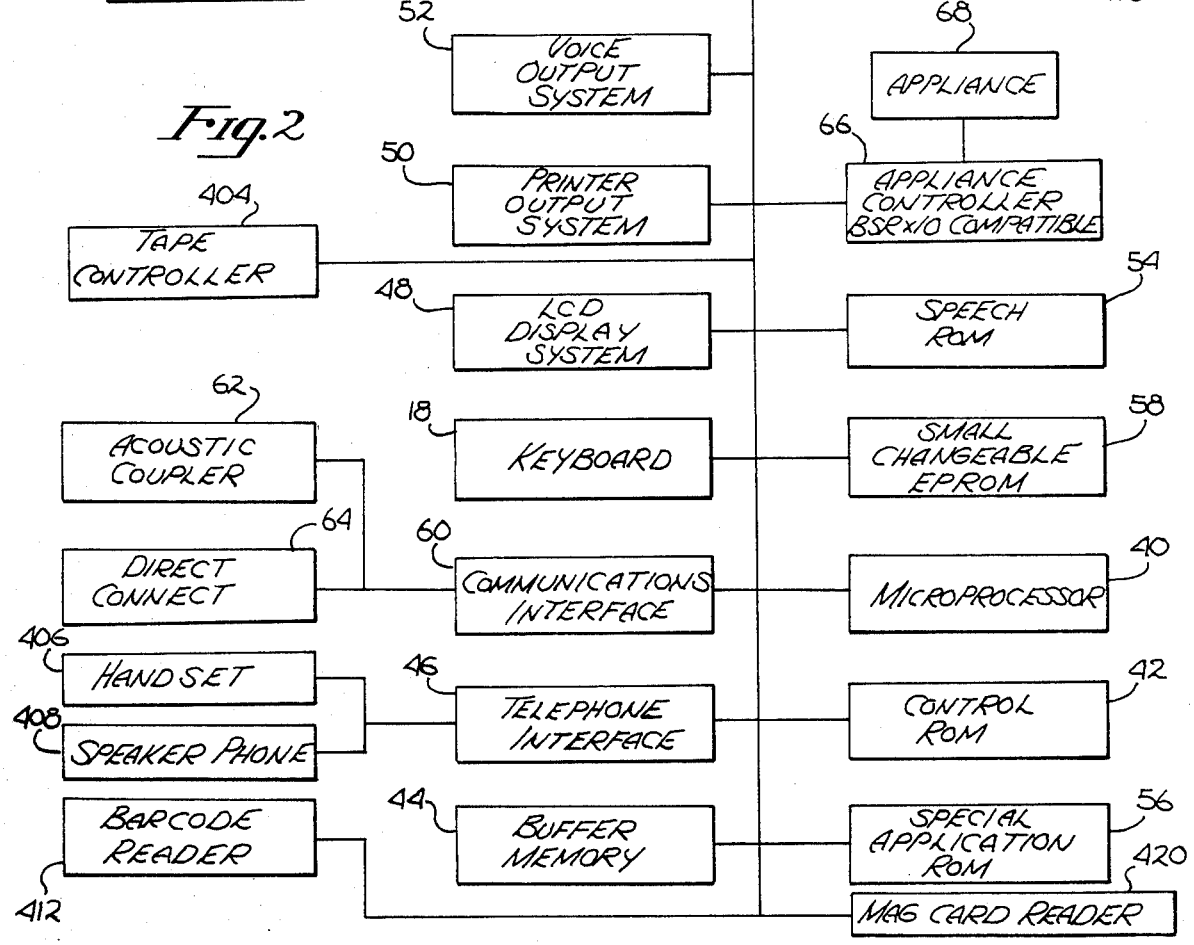
FIG. 2 is a block diagram of the system of FIG. 1.

The inter-relationship and functional organization of the various electronic subsystems contained within the case 16 of the keyboard terminal 10 are shown in FIG. 2. By turning the keyboard terminal 10 to the on condition and operating the keyboard 18, a user may communicate with and enter data into a microprocessor 40. The microprocessor 40 is controlled by a program contained within the program control read only memory 42. There is also provided to the microprocessor 40 a buffer memory 44. The microprocessor 40 has the capability to interface via a telephone interface 46 to perform various functions outlined below. The output from the microprocessor 40 can be selectively directed to a liquid crystal display system 48, a printer output system 50, and even a voice output system 52 which under user control may receive its data from a speech synthesizer and associated read only memories referred to as speech ROMs 54.

The present invention is designed to be very flexible and has the capability of accepting special application read only memories 56 in addition to small changeable EPROMS or erasable programable read only memories 58. These additional and optional subsystems give the present invention great versatility. The microprocessor 40 may be caused to activate one or more appliance controllers 66 to turn an appliance 68, such as a light, on and off. The various subsystems just referred to are linked with the microprocessor 40, and many of them may communicate over a communications interface 60 to other similar keyboard terminals by means of either an acoustic coupler 62 or by means of direct line connections illustrated as 64 in FIG. 2.

The above described system organization is a simplified version of the actual organization and it is not intended that any of the subsystems discussed and given reference numerals above will precisely correspond to any particular portion of the circuit schematics contained in FIGS. 3–7 and discussed in greater detail below. It is intended however, that the above descriptions serve to orient the reader to the various subsystems and to illustrate the general organization and intercooperation of the elements of the terminal 10 of the present invention.

In the block diagram of FIG. 2, many of the devices and/or interfaces shown therein are well known in the prior art and need not be described in great detail herein. By way of example, a rechargeable battery pack 418 may be provided to power the microprocessor and related systems on loss of main power therefor. In addition, a smaller backup battery 416 may be used to provide sustaining power for the buffer memory 44 so that data is not lost on the inadvertent short term loss of system power. Since the system is capable of maintaining significant information in the buffer memory, a video option 414 may be provided, typically incorporating an alphanumeric character generator, composite video generator and modulator for providing a multi-line display on a TV set, much like a personal computer does, in place of or in addition to the single line display 36 of the terminal. In that regard, the display 36 in the preferred embodiment is a 40 character liquid crystal display, which displays are readily commercially available. The appliance controller 66 for controlling one or more appliances 68 is a conventional output port coupled to provide the BSR compatible control signals. The microprocessor 40 itself of course, is controlled by the control read only memory 42 with various special functions or applications being provided for by a small changeable, erasable, programmable read only memory 58 and/or a special application's read only memory 56. When a conventional voice synthesizer is used, an additional speech read only memory 54, programmed in accordance with the voice synthesizer manufacturer's recommendations, will provide the controls under program control for the voice output system 52 to provide synthesized speech to the handset 406, to the speaker of the speaker phone 408 and/or to the phone line through a direct-connect 64 using conventional modular plugs, or alternatively through an acoustic coupler 62 connecting directly to the terminal.

For data communication, as shall be more specifically described herein, the telephone interface 46 and communications interface 60 include a low speed modem module (LSM) manufactured by Novation, which provides any of a variety of selectable standard frequency shift keyed modem formats. The communications and telephone interfaces are well known in the prior art, as various embodiments thereof have been used with computers in prior art data terminals.

Inasmuch as the microprocessor based system is a bus oriented system in the sense that the microprocessor control ROMs buffer memory and I/O devices such as the keyboard 18 and LCD display system 48 are in parallel on a common bus, additional connections may be made to that bus to provide common well known communications and/or control I/O capabilities. By way of specific example, a conventional RS-232 port 402 may readily be coupled to the bus for direct communication with any other device having an RS-232 capability. Similarly, tape controller 404 may provide a control to a voice tape recorder so as to convert the commands provided thereto over the bus to play, record and rewind control for the recorder to provide automatic transmission and/or receipt and recording of voice communications. Obviously many other devices and/or controllers may also be added, such as a conventional bar code reader 412 and a mag card reader 420. Such devices are well known in the prior art so that the detailed description of the devices and the controllers therefor would only detract from the disclosure herein.

Figure 3:
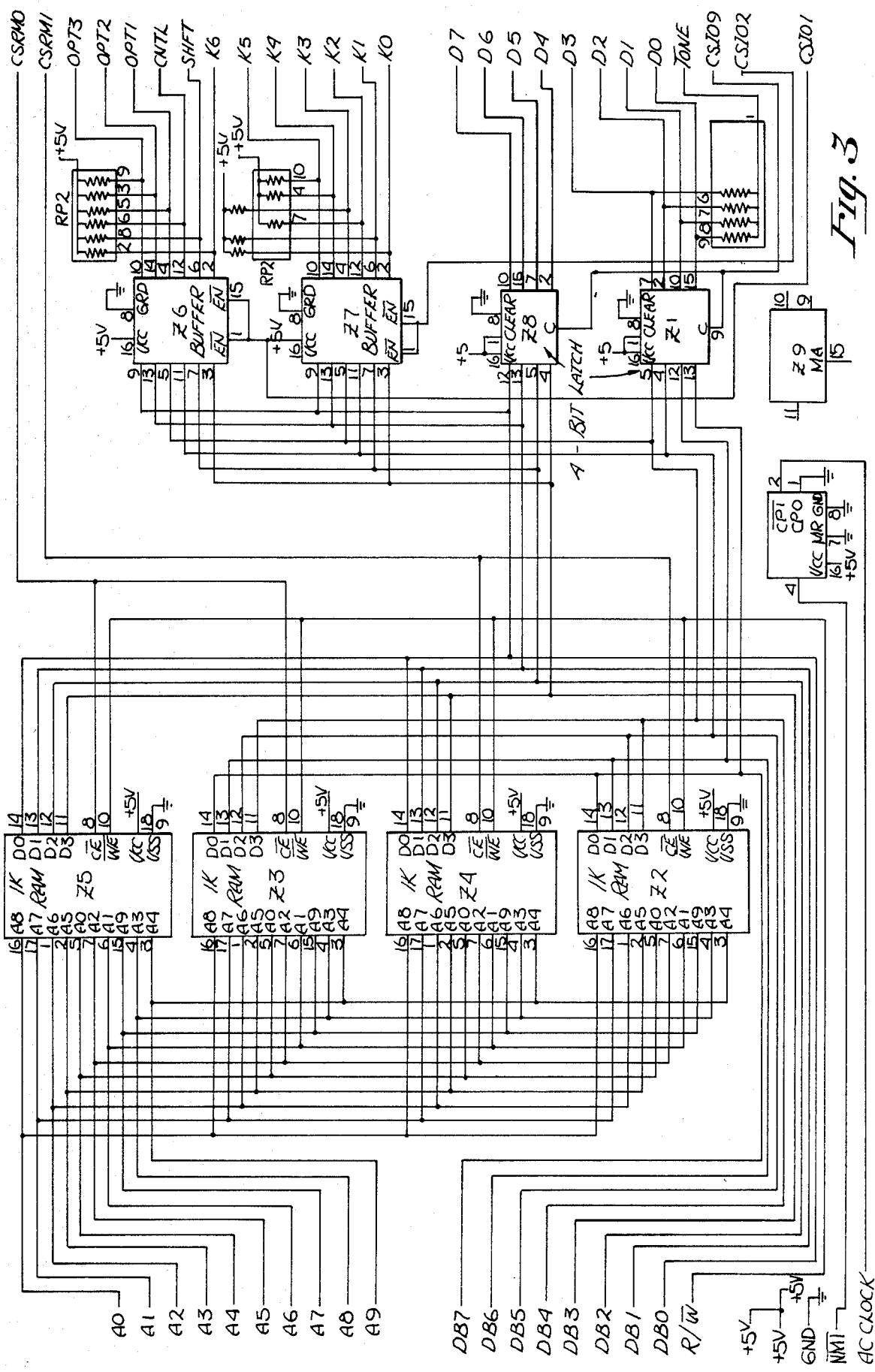
FIG. 3 is a circuit diagram of the random access memory subsystem.

The basic input and output as well as random access memory portions of the keyboard terminal 10 are shown in FIG. 3. The output signals generated by depression of any one of the keys 20 are all multiplexed such that for a particular key 20, the signal indicating the symbol associated with that key, will appear on the lines labeled K0–K6 and D0–D7 in FIG. 3. Certain other keys have their own input lines such as the SHFT line and the control key which has its input transmitted over the line CNTL. In addition, the status keys 30 have their own input lines labeled OPT 1, OPT 2 and OPT 3. The input signals on lines K0-K5 are coupled to the appropriate pins of a hex tri-state buffer Z7. The input lines K6, SHFT, CNTL, OPT 1, OPT 2 and OPT 3 are coupled to the appropriate pins of a second hex tri-state buffer Z6. The input line D0, D1, D2 and D3 are coupled to the appropriate pins of a four-bit latch Z1. The inputs on lines D4, D5, D6 and D7 are coupled to the appropriate pins of a second four-bit latch Z8.

Other inputs shown in FIG. 3 include the chip select input/output number 9 signal which appears on the line designated CSIO9 and is coupled to the appropriate pins of the four-bit latches Z1 and Z8. The chip select input/output signal number 2 which appears on the line designated CSIO2 is coupled to the hex tri-state buffer labeled Z7. Another input is the chip select input/output signal number 1 appearing on the line designated CSIO1 which is coupled to the appropriate pins of the second hex tri-state buffer labaeled Z6. The input on the line labeled TONE is also coupled to the various inputs of the four-bit latch Z1. The input comprising the signals on lines CSRM0 and DSRM1, and the output side (pins 9, 13, 5, 11, 7 and 3) of the two hex tri-state buffers Z6 and Z7, as well as the output side (pins 12, 13, 5 and 4) of the two four-bit latches Z1 and Z8 are appropriately coupled to various of the 1K by four-bit random access memory chips designated Z2, Z3, Z4 and Z5. The same output signals from the four four-bit latches Z1 and Z8 and the two hex tri-state buffers Z7 and Z6 are also coupled to the CPU bus over the lines labeled DB0-DB7, and are appropriately coupled to the microprocessor 40 as discussed below.

Each of the four 1K by four-bit random access memory chips Z2, Z3, Z4 and Z5 is activated in response to the state of the chip select signals on lines CSRM0 and CSRM1. CSRM0 is the chip select signal line for the RAMs labeled Z5 and Z3, while the signal on line CSRM1 will activate the RAMs labeled Z2 and Z4. The presence of a signal on the appropriate line will cause the appropriate random access memories to be selected. In the same manner the presence of a signal on lines CSIO9, CSIO2, or CSIO1 will cause appropriate activation of the respective four-bit latches Z1 and Z8 or the appropriate hex tri-state buffers Z7 or Z6.

When data has been entered from the keyboard 18 along the respective data lines such as K0-K6 and D0-D7 the data will be held momentarily in either the hex tri-state buffers Z6 and Z7 or in the four-bit latches Z1 and Z8 until such time as it is called for by the microprocessor 40 and transferred to the appropriate storage address of the 1K by four-bit RAMs Z2, Z3, Z4 and Z5, as indicated by the address appearing on the lines A0-A9. These ten address lines A0-A9 permit the addressing of up to 1024 different addresses. Each of these input address lines A0-A9 is coupled to each of the four 1K by four-bit random access memories Z2, Z3, Z4 and Z5. The state of the signals on these lines A0-A9 determines the address, within the four 1K by four-bit RAMs, to which data is read into the RAM or from which data is read out of a particular RAM. Data may be written into the RAMs or read out of the RAMs in this manner regardless of its source device or destination device on the bus.

With respect to the four 1K by four-bit random access memories Z2, Z3, Z4 and Z5, it should be noted that the data appearing on lines DB0-DB7 is appropriately divided into two sections. Thus, the data appearing on lines DB0, DB1, DB2 and DB3, is coupled only to the appropriate lines of the RAMs Z4 and Z5. The data appearing on lines DB4, DB5, DB6 and DB7 is coupled only to the appropriate input lines of the random access memories Z2 and Z3. Thus suppose, for the moment, that an activating signal appars on the line labeled CRSM0. This signal will then activate the random access memories labeled Z3 and Z5. The information appearing on lines DB0, DB1, DB2 and DB3 would therefore be stored in or read out from the random access memory labeled Z5, whereas any information appearing on lines DB4, DB5, DB6 and DB7 would be stored in or read from the random access memory labeled Z3. The address at which the information would be stored, or from which the information would be read, would be as indicated by the data appearing on lines A0-A9. It can thus be seen that by appropriate activation of the signal on lines CSRM0 data appearing on lines DB0-DB3 or lines DB4-DB7 can be appropriately stored in a selected one of the random access memories Z2, Z3, Z4 or Z5.

The signals appearing on the various input lines illustrated in FIG. 3, together with the various hex tri-state buffers Z6 and Z7 and the four-bit latches Z1 and Z8 together with the four 1K by four-bit random access memories Z2, Z3, Z4 and Z5 comprise what is basically referred to as the Input/Output random access buffer memory structure. This random access memory structure is coupled to the micrprocessor 40 discussed below and is addressed by the data appearing on the lines A0-A9. At the designated address the microprocessor 40 will either store or read from the random access memory the data appearing on the lines DB0-DB7. The type of operation which is executed, that is, a read or a write and the particular unit from which or to which the data is read or written is determined by a program stored in read only memory which is also discussed below.

Figure 4:
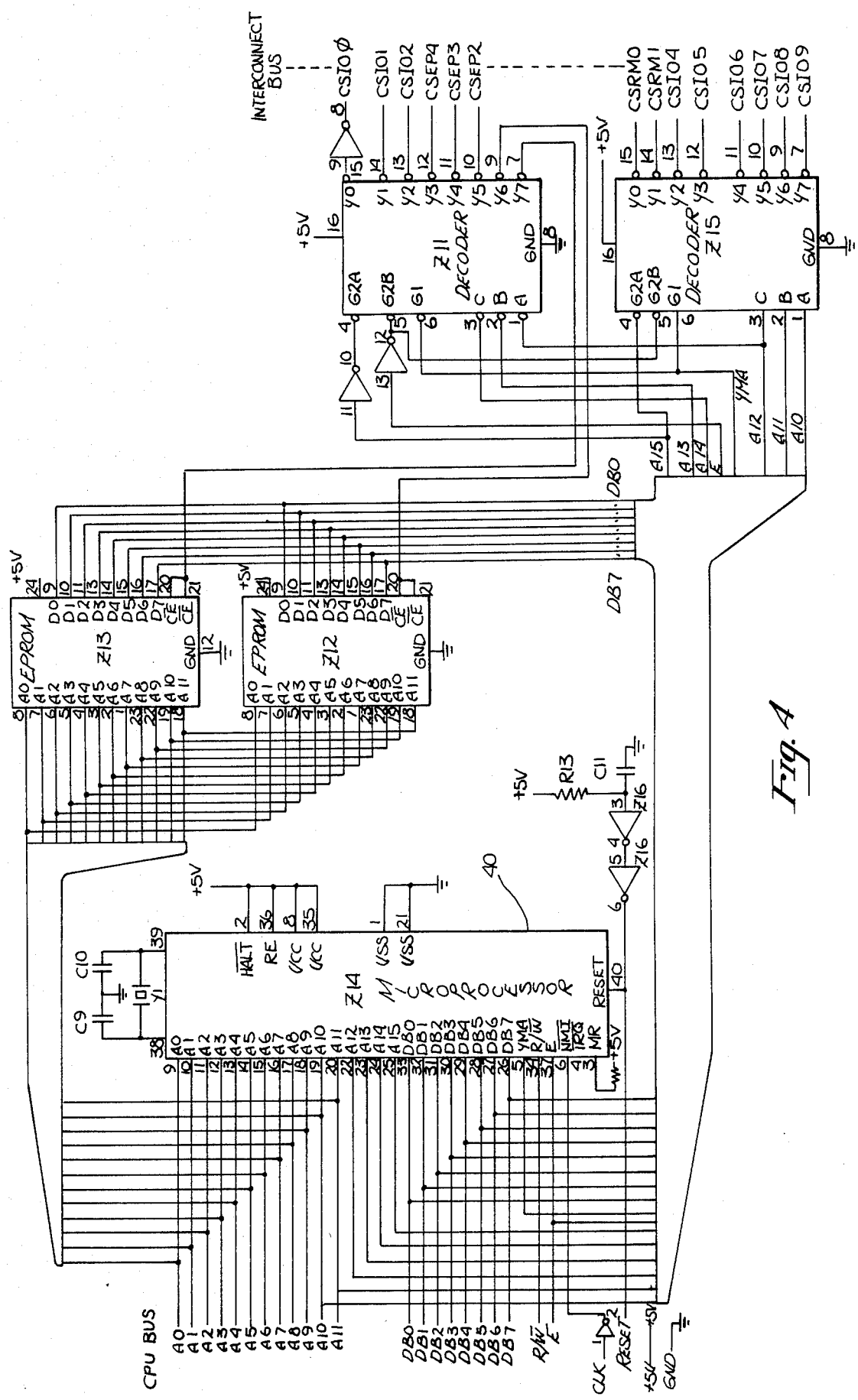
FIG. 4 illustrates the interconnection of the central processing unit with the read only memory for program storage and the decoders for generation of chip select signals.

FIG. 4 shows the interconnection of the central processing unit, that is, the microprocessor 40 also designated Z14, with the memory in which the program is stored, that is, the erasable programable read only memory Z12 and Z13. FIG. 4 also shows the appropriate decoders Z11 and Z15 which use various of the signals processed by the microprocessor Z14 to generate the multitude of chip select signals appearing on lines CSIO0 through CSIO2 and CSIO4-CSIO9 as well as those chip select signals appearing on lines CSEP2, CSEP3, CSEP4, CSRM0, and CSRM1. From an overview standpoint the various chip select signals generated at the output of the two decoders Z11 and Z15 are used to determine which of the various semiconductor chips should be activated at any particular time. Thus, when the appropriate signal appears on the line CSEP3, then the appropriate chip, that is Z21, will be activated, because it is that chip, Z21, which is coupled to the CSEP3 line. (See FIG. 6)

The program which controls the operation of the microprocessor Z14 is contained in the two semiconductor chips identified as Z13 and Z12. These two semiconductors chips constitute two 32K EPROMs, or erasable programable read only memories. These two semiconductor chips Z12 and Z13 are coupled to both the address lines A0-A11 and coupled to the data bit lines DB0-DB7. In this manner data may be read from or stored inside the erasable programable read only memories Z12 and Z13 at the address appearing on the address lines A0–A11. The data which is stored at the particular address or the instruction that is read out of that particular address will then appear on the appropriate data bus lines DB0–DB7.

The various chip select signals appearing on the output of the two decoders Z11 and Z15 are generated solely from the signals appearing on pins 19–25 and pins 5 and 37 of the microprocessor Z14. These decoders also provide the appropriate $\overline{CE}$ signals appearing on the output pins 7 and 9 of the decoder Z11 which enable the erasable programable read only memories Z12 and Z13. By means of these interconnections the microprocessor Z14 can communicate with the program stored in the erasable programable read only memories Z12 and Z13 to govern the processing which the microprocessor Z14 conducts. Information generated by the microprocessor is also used to generate other signals through means of the decoders Z11 and Z15 which signals will determine which of the other semi-conductor chips are to be activated. By selection of those chips which are to be activated, the microprocessor Z14 can either read information from the activated chip or can write information into the activated chip, or otherwise cause the activated chip to perform the task for which it was designed, such as the creation of simple switch closures, for appliance control, or for conventional modem control or printer control, to name a few specific examples.

Figure 5:
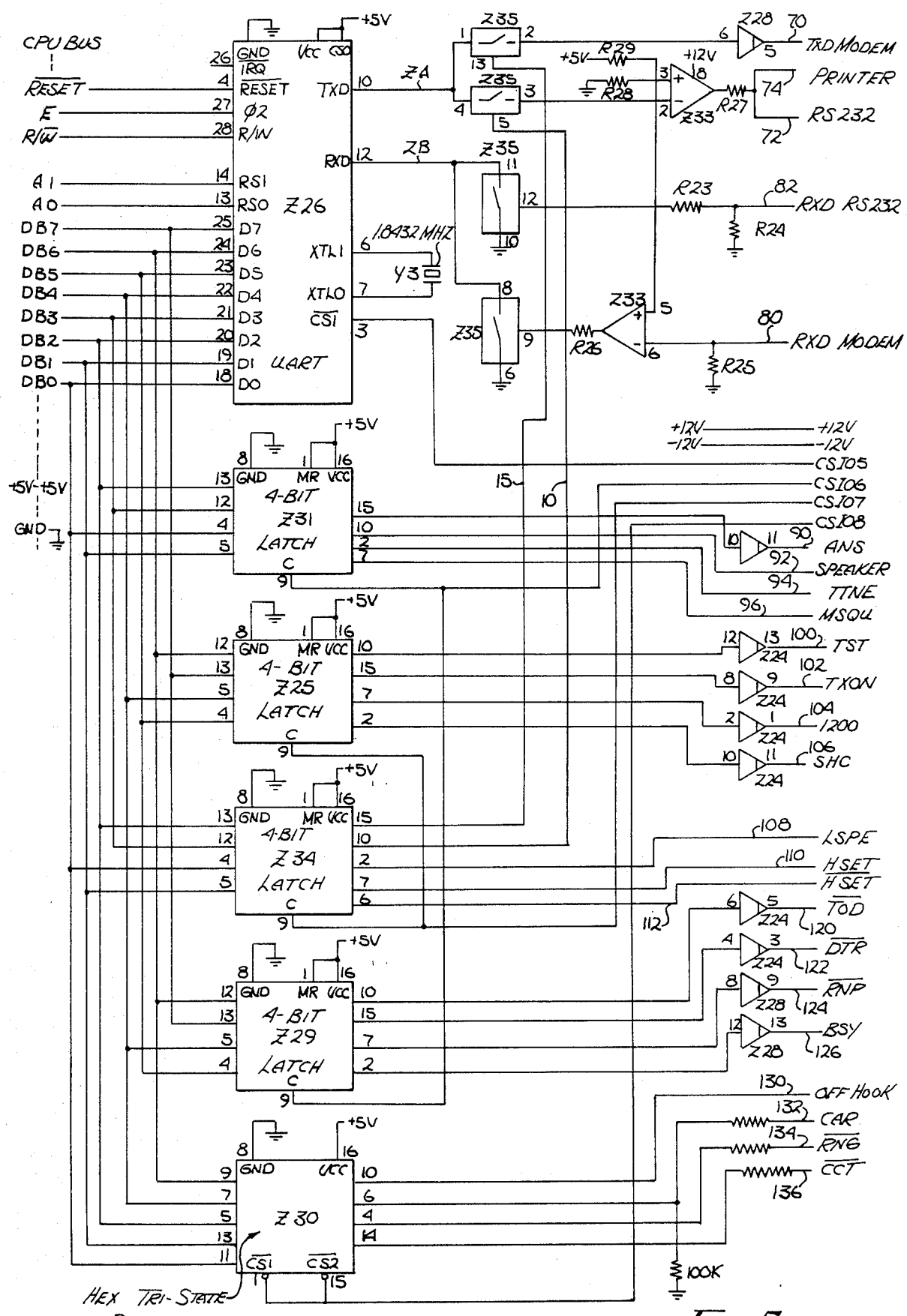
FIG. 5 is a schematic of the modem control and communications interface.

The microprocessor Z14 communicates with the various output devices through a well-known device called a UART, that is a universal asynchronous receive transmit unit indicated as Z26 in FIG. 5. The data appearing on th data bus lines DB0–DB7 coming in from the central processing unit bus are applied to the input terminals of the UART Z26 which takes the data appearing on those lines DB0–DB7 in parallel format and transmits that data over the line ZA through the pair of multiplex/demultiplex Z35s and various operational amplifers such as Z28 and Z33 to appear on selected lines such as lines 70, 72 or 74 which are respectively connected to a modem, U.S. or a European format data terminal, an RS 232 interface, or a printer. Similarly, information may be received from a modem over line 80 or from a European format data terminal over line 82, and this data will be received by the multiplex/demultiplex Z35. The multiplex/demultiplex will then take the data received from the appropriate line (80 or 82) and transmit it over line ZB, and it will be received by the UART Z26 on pin 12. The UART will convert the serial data to parallel format data. This parallel format data will then be applied to the data bus lines DB0–DB7 for further processing by this system.

With respect to the UART Z26, it should be noted that in the embodiment disclosed herein the control program which is stored in the EPROMs Z12 and Z13 permits the user of the terminal 10 to vary the BAUD rate of the UART. Thus the UART may process information at 300 BAUD or at 110 BAUD depending on the compatibility of a particular rate with various other equipment with which the keyboard terminal 10 may communicate.

Besides interfacing with the peripheral equipment through the UART and the pair of multiplex/demultiplex Z35s the data appearing on the data bus lines DB0–DB7 is also applied, through four four-bit latches Z31, Z25, Z34 and Z29 and through a hex tri-state buffer Z30, to a series of amplifiers and output lines which provide (or receive) the data passing through the respective latches or buffer to (or from) various external lines or equipment. Line 90 carries the signal ANS, a logical signal indicating whether the modem is in an answer or originate mode. Line 92 carries the logical signal SPKR which enables or disables the speaker J16 of the data terminal 10. Line 94 carries the logical signal TTNE for enabling or disabling the operation of the touchtone. Line 96 carries the logical signal MSQU a modem squelch enable/disable signal. When enabled, data being transmitted is prevented from going through the audio portion of the circuits when a user is listening on the hand set phone unit. Line 100 carries the signal TST, a self test line for determining operation of the modem. Line 102 carries a signal TXON indicating that modem transmission is occuring. Line 104 carries the signal SHC, a shift hook control signal present when the phone is "off the hook". Signal LSPE carried on line 108 is a logical signal for enabling or disabling operation of the speech synthesizer. HSET AND $\overline{HSET}$, on lines 110 and 112 respectively, enable and disable the handset. Line 120 carries the signal $\overline{TOD}$ for disabling the touch tone output. Line 122 carries the logical signal $\overline{DTR}$ for verifying data terminal connection to the phone lines. Line 124 carries the ring pulse signal $\overline{RNP}$, and line 126 carries the signal BSY indicating that the phone line is busy. Line 130 carries the OFF HOOK signal indicating whether the handset is on or off its "hook". The signal CAR on line 132 is a signal indicating detection of the carrier signal on the phone line. Line 134 carries the $\overline{RNG}$ signal, a signal to enable or disable the ring. Signal $\overline{CCT}$ on line 136 is a carrier cut through signal. This signal will allow or inhibit passing data through the line.

Figure 6:
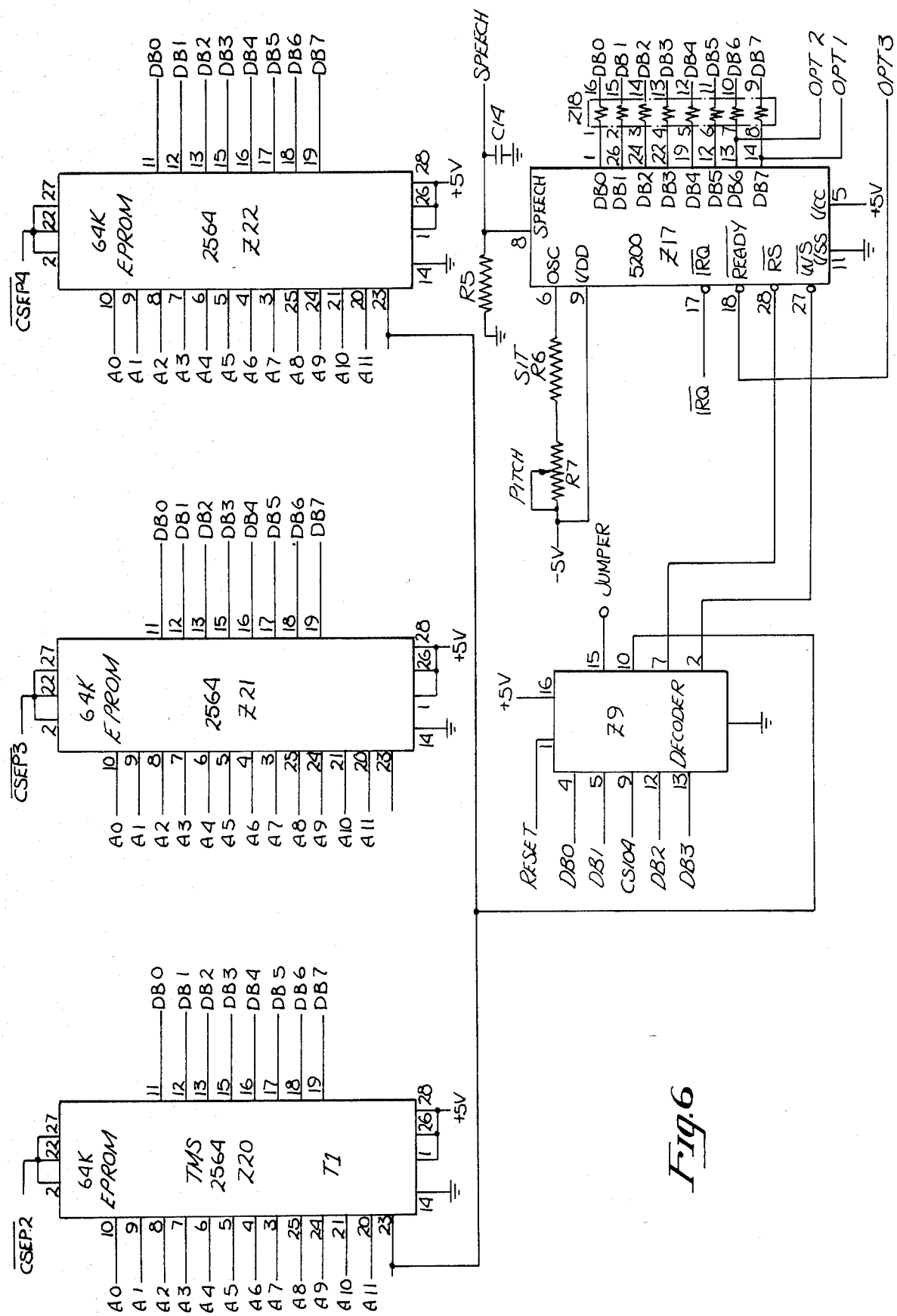
FIG. 6 is a schematic of the interconnections of the speech synthesizer.
Figure 7:
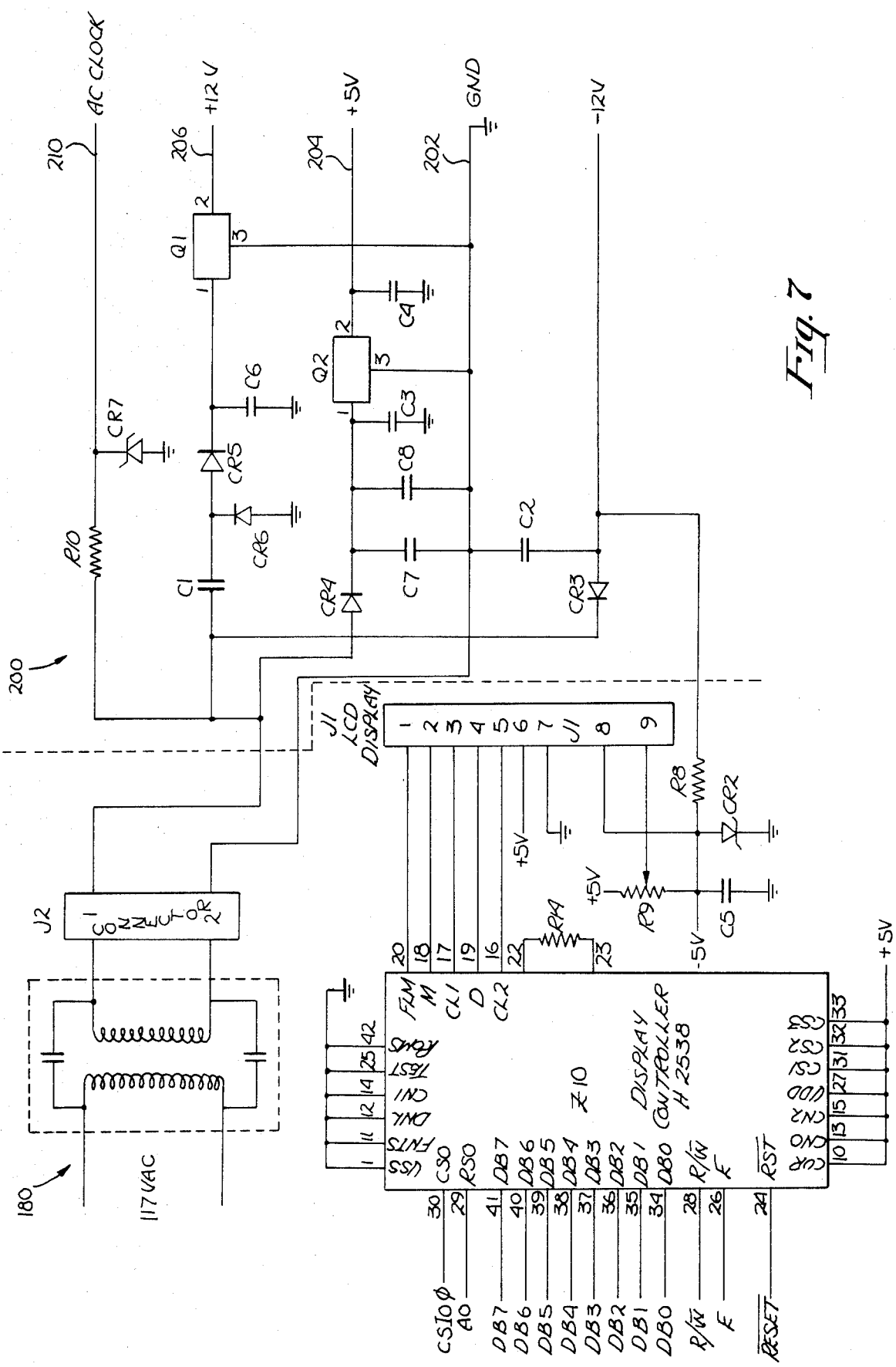
FIG. 7 shows the power supply and liquid crystal display subsystems.

An optional feature of the present invention is the presence, within the circuitry of the keyboard terminal 10, of a speech synthesizer and corresponding memory to enable the keyboard terminal 10 to actually speak certain preselected messages or otherwise speak the identity of keys 20 which have been depressed on the keyboard 18. As shown in FIG. 6 the memory for the speech synthesizer, that is a memory which stores the vocabulary for the speech synthesizer is located within the three erasable programable read only memories designated Z20, Z21 and Z22. Each of these erasable programable read only memories is a 64K bit memory. As discussed earlier, each of these EPROMs is individually selected for activation by the microprocessor Z14 sending an individual activation (chip select) signal to the respective EPROMs. Thus, erasable programable read only memory Z20 is activated by the presence of a signal on line CSEP2, similarly Z21 is activated by the presence of a signal on line CSEP4. When so activated the respective read only memory will be enabled to either store information into the memory or to have information read out from the memory. The address at which the storing or writing takes place will be as appears on lines A0–A11. The information that is read out of the memory will appear on lines DB0–DB7.

The speech synthesizer Z17 is a commercially available component and, by using the data appearing on lines DB0–DB7 as inputs, will generate a signal at pin 8 which is the synthesized speech representing the input data. The speech synthesizer Z17 will be caused to be in the read or speak mode depending on the output of the decoder Z9. The inputs to the decoder Z9 are the signals DB0–DB4 and the signal appearing on CSIO4, that is the chip select input/output signal 4 which is generated on pin 13 of the decoder Z15 shown in FIG. 4. The speech synthesizer Z17 may be caused to synthesize speech by the microprocessor Z14. By providing an appropriate address on lines A0–A11, and the appropriate chip select signal to the appropriate erasable programable read only memories Z20, Z21 or Z22, data can be made to appear on the output lines DB0–DB7 of that programable read only memory which will be the inputs to the respective data lines DB0–DB7 of the speech synthesizer Z17. Utilizing that input data, the speech synthesizer Z17 will generate a signal emulating speech corresponding to the input data. That signal will appear on pin 8 of the speech synthesizer Z17 as shown in FIG. 6. If that signal is then coupled to a speaker a person will be able to hear an audio representation of the data appearing on those lines DB0–DB7. If desired, the data appearing on lines DB0–DB7, besides controlling the speech synthesizer Z17, can also be used to cause the display of a corresponding message on the liquid crystal display.

Power to the above described system is supplied through the power supply circuit including th wall mounted transformer 180 and the associated circuitry 200 which provides the ground 202 and the 5 and 12 volt references on lines 204 and 206 respectively as well as an AC clock signal appearing on line 210.

Figure 8:
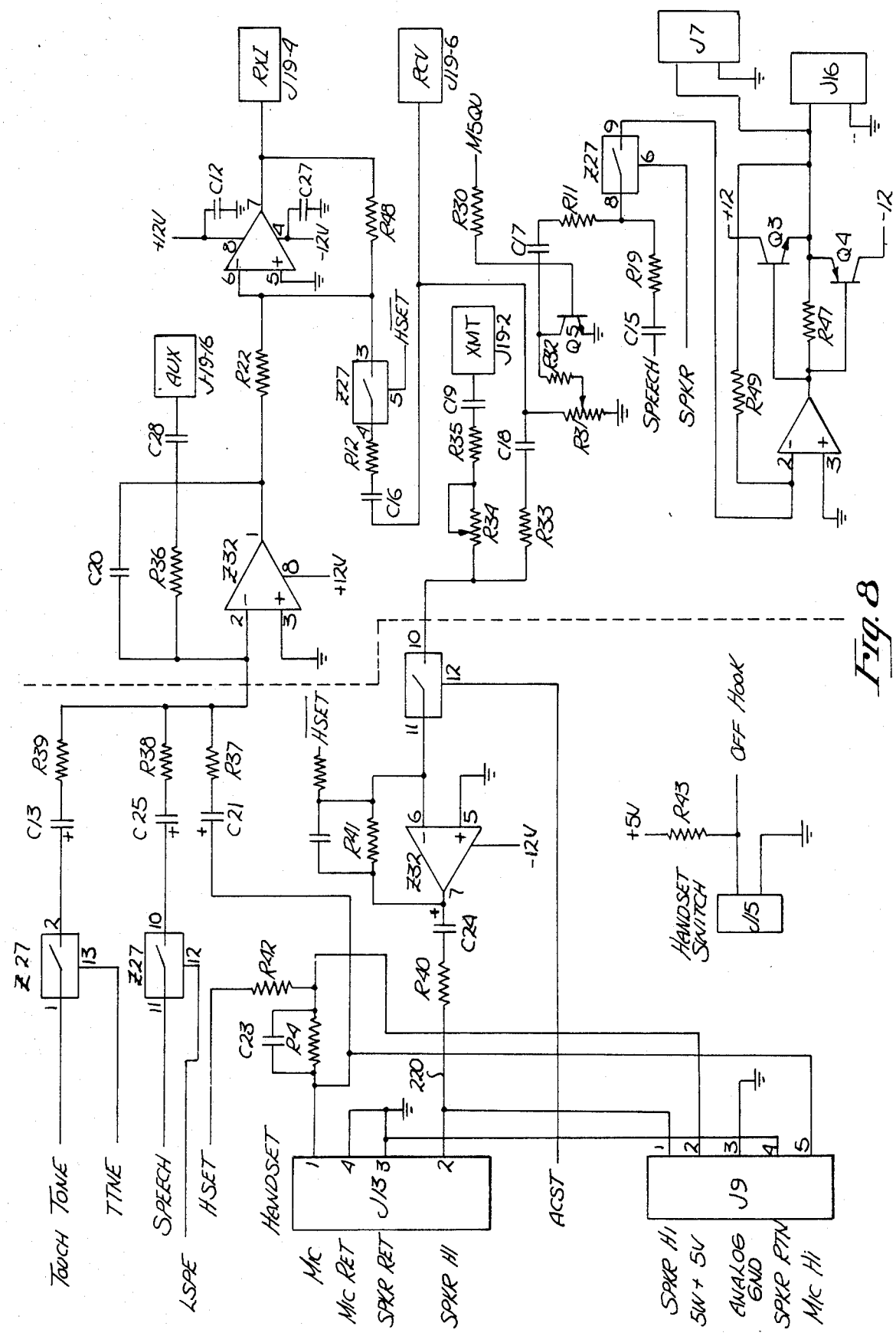
FIG. 8 shows the circuitry driving the speaker to provide audio output.
Figure 9:
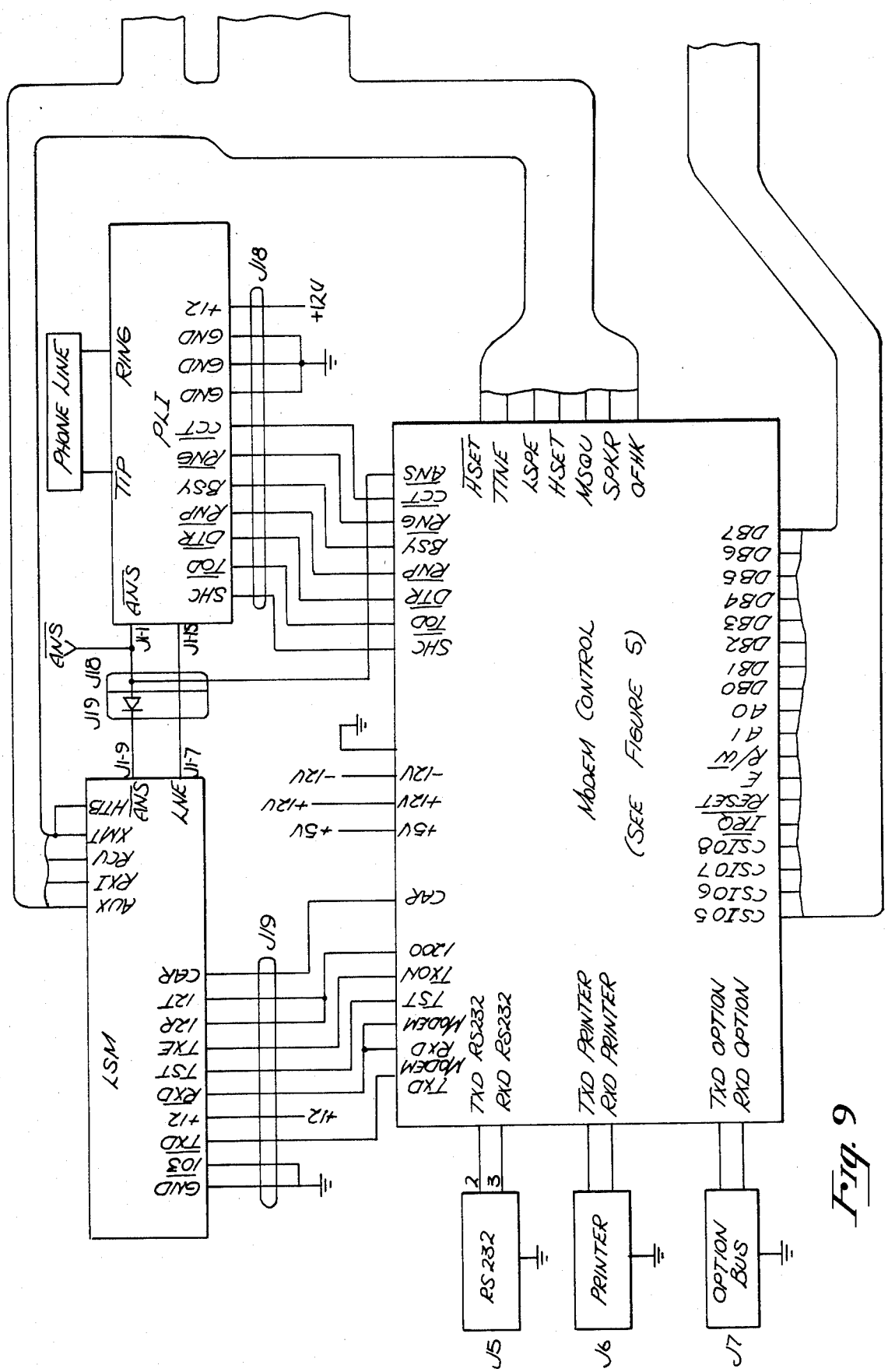
FIGS. 9 through 12 form a composite illustration of the overall electrical interconnection of the various subsystems of the invention.
Figure 10:
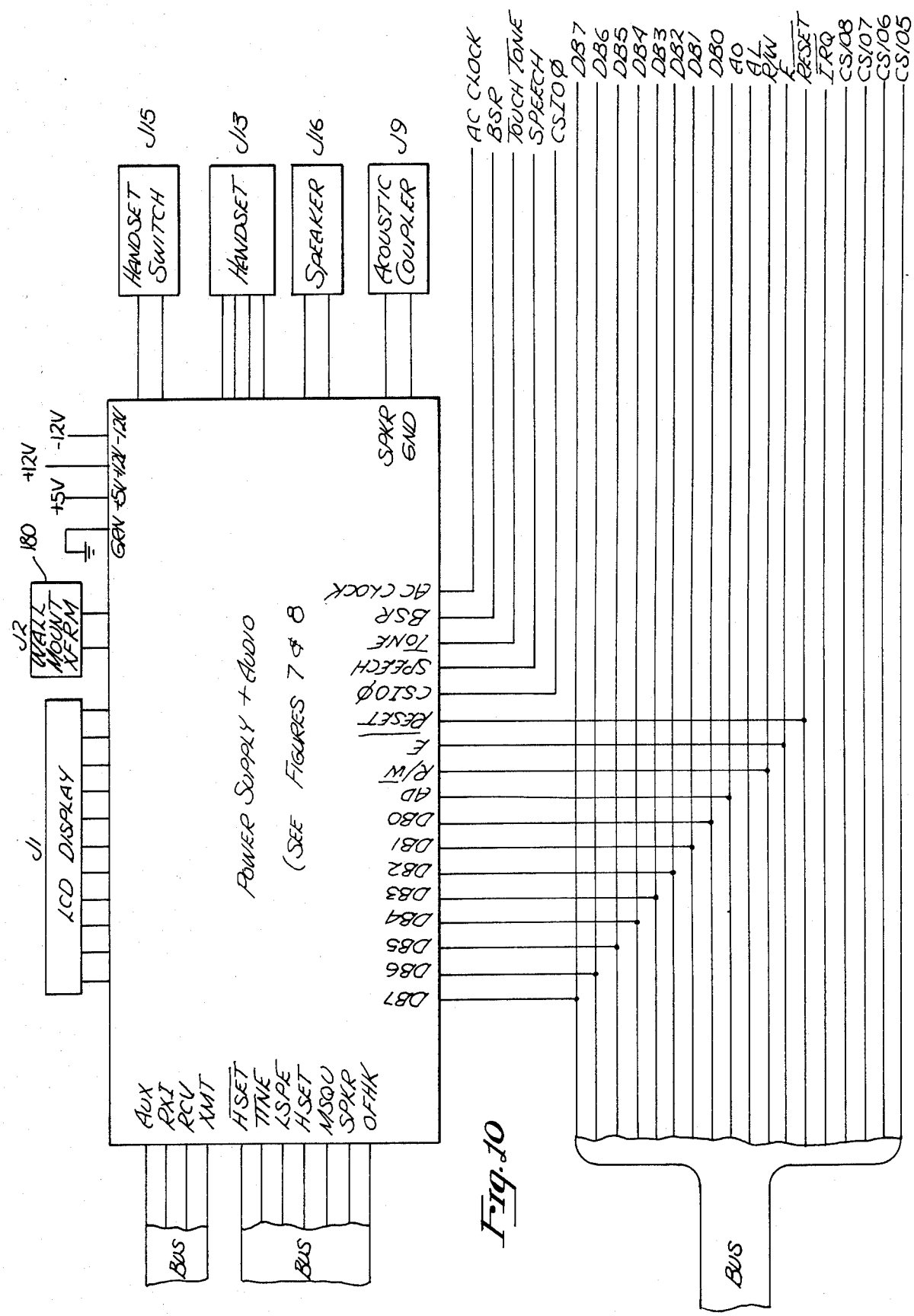
Figure 11:
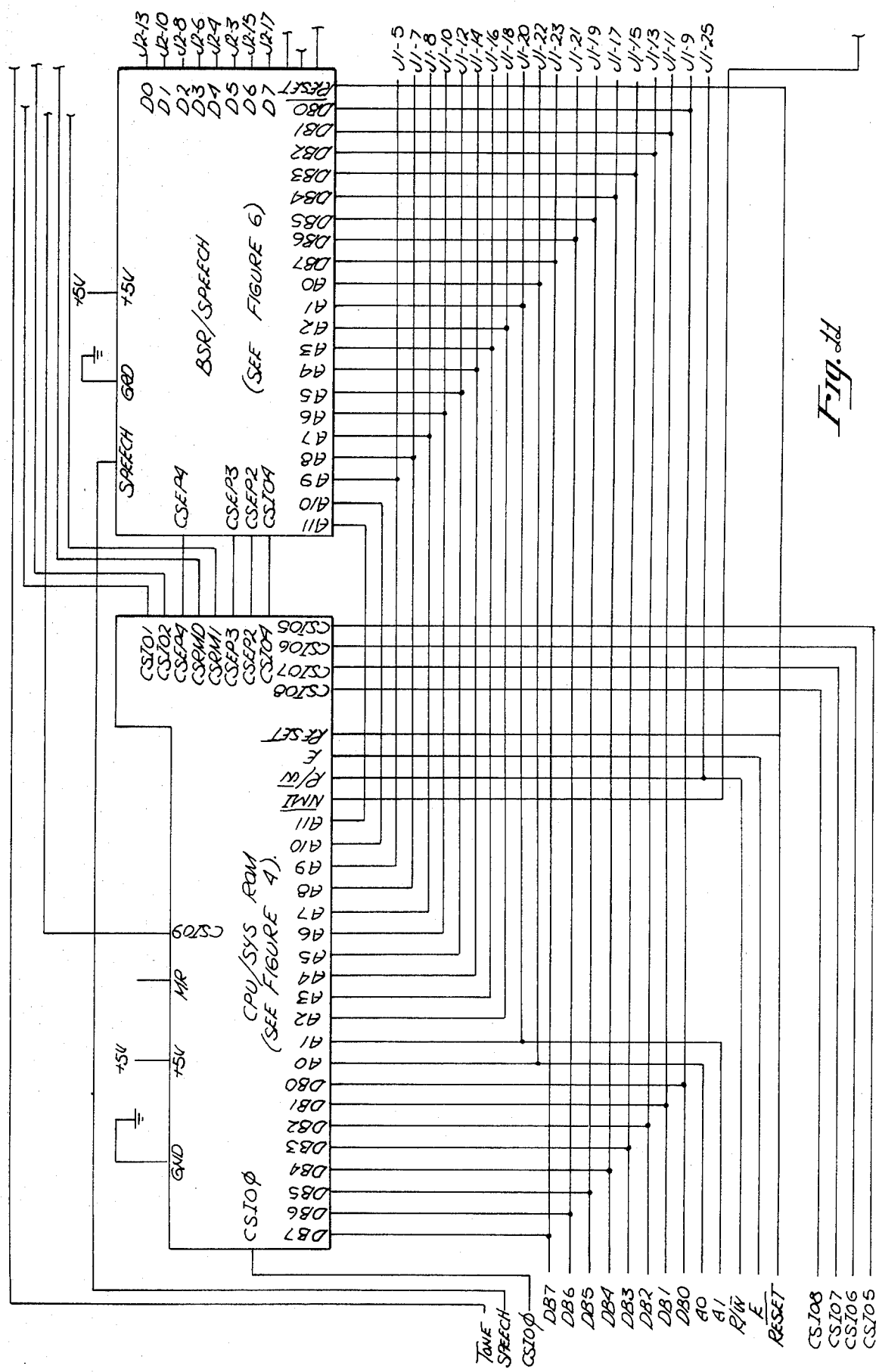
Figure 12:
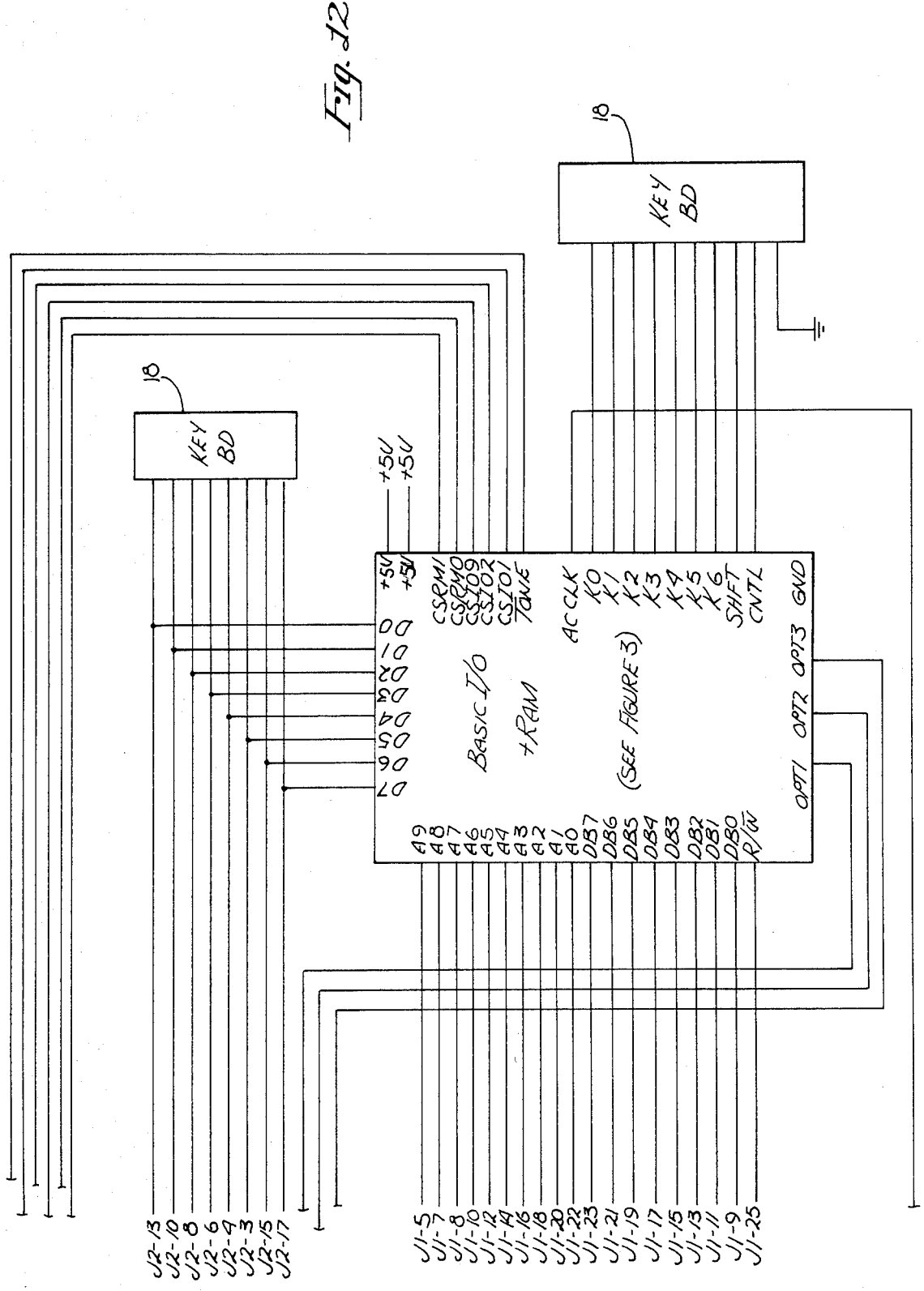

The various audio signals such as appearing on line TOUCH, TONE, TTNE, SPEECH, and HSET, or as generated by the hand set J13 or received through connector J9, can each be applied through various circuitry (shown in FIG. 8) to one of the various output terminal ports such as line AUX, line RXI, line RCV, or line XMT. AUX is an auxiliary port for accommodating an additional audio input state. RXI accepts input data and channels it to the handset receiver. RCV is the output line of a telephone, i.e., what a user would hear. XMT is the output line of a modem transmitter, the data is sent to a phone line and acoustical coupler. In addition, the audio signal from the hand set on line 220 can be applied to the speaker J16.

The interconnection of the various above described subsystems is shown in the interconnect diagram comprising the FIGS. 9, 10, 11 and 12. The left most portion of the interconnect diagram is FIG. 9. The right edge of FIG. 9 mates with the left edge of FIG. 10. The right edge of FIG. 10 mates with the left edge of FIG. 11 and the right edge of FIG. 11 mates with the left edge of FIG. 12, completing the interconnect diagram. The interconnect diagram provides a compact figure illustrating how the various circuitry shown in FIGS. 3, 4, 5, 6 and 7 interconnect with each other, and is self explanatory so as to not require further description.

The system described above can be customized depending on the precise embodiment of the control program appearing in the erasable programable read only memories Z13 and Z12. Such a program may specify various customized features which are capable of implementation on the above described system. One embodiment of the present invention is operated under the control of the program, a copy of which is attached hereto as Appendix A.

The software program stored in the erasable programable read only memories Z12 and Z13 may of course be varied to particularly suit the ultimate user of the terminal 10. By modifying the software, the terminal may be made compatible with various external peripheral devices to perform specified functions. Specifically and as more fully discussed below, the software may direct the central processing unit or microprocessor Z14 to indicate to the user of the terminal that a telephone call has been received by alternately turning "on" and "off" a given appliance such as a light within the user's home. The particular appliance to be turned on and off may be user selected and modified from time to time according to the operation of the control program. It should therefore be recognized that the various features which are about to be described are entirely variable and may or may not appear in a specific package depending on the request of the ultimate user of the particular package. It should further be noted that additional features may be added by a simple modification of the program which is stored in the erasable programmable read only memories Z12 and Z13 and the addition of well known peripheral interfaces to implement and respond to the instructions entered at the keyboard or programmed into the terminal.

The keyboard terminal 10 may be instructed to operate in a mode to emulate the usual data terminal for accessing a time sharing computer system. In such a mode, access to the time sharing computer is gained by turning power on to the keyboard terminal 10 and by dialing the specified telephone number for the time sharing computer system. If the terminal has a DAA connection automatic dialing can be accomplished. Manual dialing of the time sharing computer is effected by the operator dialing the computer via the normal telephone dialing system. The operator then waits for the appropriate modem tone and then puts the hand set in the acoustic adaptor. When the connection is established between the time sharing computer and the keyboard terminal 10 the words "System On Line" are then spoken by the voice synthesizer subsystem of the keyboard terminal 10 and those words are also displayed on the liquid crystal display designated J1 in FIG. 7.

The dialing may be accomplished automatically if the system is equipped with a DAA and the user first presses the control key and the letter A. The keyboard terminal 10 will then prompt the user for the appropriate telephone number of the time sharing system. After the telephone number is entered by the user, the terminal will prompt the user with the question "Store or Dial; S or D'..If the user enters S the user is prompted for a name comprising 1 to 6 characters. Upon entry of the name the phone number is stored in memory under the entered name and future prompts for the phone number can be answered by the user typing the 1 to 6 character name rather than the number itself. The terminal will then automatically dial the number stored under that name. If the answer to the S or D question is D, the keyboard terminal 10 will then dial the appropriate number and establish a connection with the time sharing computer. When the connection is established, the words "System On Line" are spoken and displayed on the liquid crystal display as before.

If the connection is broken, the words "System Off Line" are spoken by the speech synthesizing system and the same words are also displayed on the liquid crystal display.

Phone numbers which are stored take up buffer space, though many phone numbers can be stored if that is all that the buffer is used for. By use of the EDIT subroutine (described below) the phone numbers previously stored may be purged.

The terminal communication rate will automatically default to 300 BAUD. This rate may be modified by the user. To modify the rate the user must press the function FUNC key, the control, CNTL key, and the letter V before dialing the phone number. The keyboard terminal 10 will then prompt the user to select a speed different than the 300 BAUD. After the connection is made the terminal will automatically send two letter Hs. This allows a particular system to adjust the speed of its modem to the terminal. The 100 BAUD speed may be used if it is found to be more reliable is a particular situation.

After selecting the appropriate speed the terminal operator will then sign on to the time sharing system. The operator will wait for the time sharing computer to send back a carriage return, a line feed, a number of rub outs and then the letter U followed by the pound symbol, the equal sign and then followed by the letters DCl and another couple of rub outs. The terminal 10 will ignore all the carriage returns, line feeds and rub outs. When the terminal receives the message U#=DCl, the terminal will speak the word "Enter User Number" and will display the message U#=on the display. The operator will then enter his user number, by means of the keyboard, in a particular preselected format. Once the time sharing computer has recognized and received the appropriate pass word from the user, commands can be entered and executed and programs can be run by the user.

The mode in which the keyboard 10 is operating may also be controlled. For example, by entering a message beginning with the ESC key followed by a particular action code, a message and an EOT key depression, the operator may cause the terminal to simply display the message, speak the message, both speak and display the message, print the message, display and print, speak and print, or speak, display and print the message. As a particular illustration, if the command "ESC, A, message, EOT" is given, the terminal 10 will only display the message received. Other appropriate code letters will place the keyboard terminal 10 in other desired modes.

Various functions can be generated within the terminal by following appropriate control sequences. A control sequence is generated by use of the "FUNC" key followed by holding the "CNTL" key down while pressing the designated function key. The codes generated in the function control sequence are not transmitted by the terminal. However, the action which is to be taken as a result of the control sequence is displayed on the liquid crystal display. If the terminal is operating in the voice mode the terminal will also speak the function key letter selected. Thus the terminal will speak "V selected" when a change in the BAUD rate has been requested. Any function may be reset by resetting the control sequence for that function. As an illustration if the "FUNC" key is depressed and the "CNTL" key is held down while the letter L is pressed, the keys on the keyboard are placed into the standard typewriter mode with the lower case unshifted and upper case on shift. If instead of the letter L the letter N was depressed this would allow the operator to select or deselect the "numeric pad" as explained above. If the letter S was depressed instead of the letter L this would allow the operator to see the status of the terminal on the liquid crystal display. If the letter P is depressed this would allow the operator to manually select or deselect the printer, that is the data output would be applied to the printer interface. By depressing the letter B in the function control mode the contents of the buffer would be transmitted. Depression of the letter C would clear the contents of the buffer. By depressing the FUNC key and the CNTL key plus the letter F, the system is put off-line and enables the operator to select the file which is to be transmitted at a later time. The terminal provides a conversational guide to enter the file name and "CR" returns on the line. If the letter M were depressed, this would disable or enable the message parsing for automatic generation of voice messages during system messages. Depression of the letter V would put the system off-line and enable the operator to change the BAUD rate of the system. Depressing the CR will automatically place the terminal back on-line. Depression of the letter D would allow th operator to manually disable or enable the liquid crystal display. Depression of the letter T would allow the operator to manually disable or enable the voice synthesizer. Depression of the letter R (reset) would allow multiple functions to be reset to the appropriate default status of each of them. Depression of the letter A would allow the auto dial feature using names previously stored or would allow the user to store new phone numbers for subsequent use. Depression of the letter E would allow performing local, that is local to the keyboard terminal 10, file operations within the data buffer (i.e., editing operations).

A more detailed explanation of one of the above functions is appropriate. Thus, the following explanation of the Edit, that is the depression of the letter E, command sequence is given.

The function of the editor is to provide a means for creating and modifying ASCII files in the terminal data buffer. The edit mode is accessed by depressing the FUNC key, holding the CNTL key down and depressing the letter E in sequence. When the editor is first called, the system asks for the name of the file. The user then enters the name of the file. If a new file is created the system displays the message "New File", otherwise it returns with a prompt. If there is not enough memory for a new file, the system will abort and return to the default mode. The input command, that is the depression of the letter I, allows the user to enter ASCII data into the files starting at the editor pointer. The user may move the editor pointer to the beginning of the file by depressing the FUNC key then holding down the CNTL key and then depressing the B key. After the pointer has been moved to the beginning of the particular file the terminal will display the first line of that file. The "next" command sets the editor pointer to the beginning of the next line. This command is entered by hitting the FUNC key, then the CNTL key and then the N key. After the pointer is moved to the beginning of the next line, the line that the cursor is pointing to is displayed. The depression of the letter D will display the line that the editor pointer is pointing at. Depression of the letter K for the "Kill" command will delete the line the editor is pointing to. After the line is deleted the cursor is pointing to the next line which is then displayed. The quit command is entered by depressing the Q key. This command terminates the editing session. The terminal then closes the file that the editor was editing and returns control to the time display (i.e., display of the time of day).

In order to purge a file the user first calls the editor function. When the editor is called the system first asks for the name of the file. The user enters the name of the file. Once the name of the file has been entered, that file may be purged by the control sequence of hitting the FUNC key, holding the CNTL key down, and then depressing the C key. Telephone names are considered files and can be displayed, printed or purged by means of the edit commands.

If a command is given that does not exist, the editor subroutine will give an "Illegal Command" message. If a user tries to manipulate or display data past the end of the file mark, the editor subroutine will give and "EOF" warning.

Besides the terminal control functions and the edit control functions described above, there are additional functions which may be added by subroutines to tailor the keyboard terminal 10 for particular applications. Such applications may include the performance of tasks of convenience for the deaf or blind, some of which are more fully discussed below.

TIME SET FUNCTION

The time set function is used to initialize the real time clock from the keyboard. (The real time clock function is achieved by counting of the 60 Hz line frequency as a nonmaskable interrupt under program control.) When the time set function is called by the user the keyboard 10 will display the following:

MONTH DAY YEAR 19 HR MIN

The user will then enter the first three letters of any of the twelve calendar months followed by entry of a number between 1 and 31 into the day field. The user will then enter a number between 0 and 99 into the year field and a number between 0 and 23 into the two character hour field. The user finally enters a number between 0 and 59 into the two character minute field. If, in entering any of the above data, an invalid entry is made the system will erase the data that has been entered and put the cursor back into the first position of the data field where the error was made. After all of the above entries are made the system will set the seconds to zero and will then start displaying the time updated every second. The data for seconds is not entered by the user.

CUSTOM SOUNDS

The custom sounds feature and subroutine are used to create musical sounds ("files") and to store them in the system. To create such a file the keyboard will first ask the user the name of the file. The user can then enter a file name of up to six characters. (Spaces are considered a character.) If the file name specified already exists within memory the system will erase the file name that has been entered and put the curser in the first position of the file name field. If the system does not have enough memory to create a new file, the system will give an "Out of Memory" error message and return control to the display.

After an acceptable file name has been entered, the system will then prompt the user by displaying the message "Note: DURATION TONES?". The user first enters a valid numeric entry in the duration field. If the duration is zero, the system will then close the file and return control to the time display. If the entry is non zero, the user then inputs four notes into the tone field. After the notes have all been entered, the system erases the field and starts over again asking for a new set of duration and tone.

The user can program up to eight custom sounds in the system. Each custom sound may consist of many sound segments of variable pitch and duration. These segments can be tied together to sound like chimes, bells, etc. These custom sounds can then be used to signal the user for things such as the ringing of an incoming telephone call, and so on. When power is turned on to the keyboard 10 the keyboard has a default of eight different preprogrammed custom sounds.

CALL COST

The call cost function is used to determine the cost of a telephone call that the user of the terminal originates. Once the costing parameters have been entered, they will stay in the memory until the power is turned off or the user enters a new cost parameter. The call cost option can then be used as an option on any call originated from the terminal.

The call cost function will first prompt the user for the cost of the call for the first minute. The system then accepts any number between 0 and 9999. Once the user has entered the data the system will then ask the cost of the call for each additional minute. The system will then also accept any number between 0 and 9999. While the user is making the call the system will display the cost of the call in the form $xxx.yy. Xxx is the dollar amount and yy is the cents amount. Because of the wide range of the input dollar amounts, the system can be used for professionals and consultants to keep track of client consultation cost. An example of the use of the call cost function would be entry of the following command into the terminal, that is CC 996-5060 123. This command will calculate the cost of dialing the phone number 996-5060 at the rate of $1.23 per minute. The running tab of the cost of the telephone call will be displayed while the user is making the call to this number.

QUICK CALL

The quick call function allows the operator of the terminal to make a call to any telephone number by the depression of a minimum number of keys. Once the quick call subroutine is called by the user it takes one more key depression to call the desired party. Once the quick call subroutine is called, the names stored within the memory of the system are scrolled past the display. When the user sees the name which he wants to call, the user must then press the letter corresponding to the name as he views it on the display. If the user tries to press a key that does not have a name attached to it, the system will give the appropriate error message.

The command format for accessing the quick call subroutine is the follows: "QC Code Letter (Telephone #)".

By entering a command in the above format the system will allow the user to call any one of 26 predetermined numbers by a simple sequence of keys. The use of the feature is as follows: The user will first type the letters QC and then a letter such as "C". This will enable the user to call the telephone number whose code is the letter "C". To set up a new phone number the following sequence is used. "QC C telephone number." This command then defines the code letter C to be used for the telephone number that was entered following the letter C.

PANIC CALL

When the user has preset this panic call option, depression of any key during a given time period will cause the system to automatically call a preset number. To set the panic call option, the user enters in the start time and the stop time period. For example, if the user entered in a start time of 23:00 and a stop time of 6:00, the system will automatically call the preselected and prestored number any time that any key is depressed between the hours of 11:00 p.m. and 6:00 a.m. Such a feature will also allow a user to dial a number in the middle of the night without being able to see the keyboard. The following command is an example of the use of this feature.

PC 1-213-996-5060 23:00 5:30

The above command will cause the terminal to dial the telephone number specified, i.e., area code (213) 996-5060 between the hours of 11:00 p.m. and 5:30 a.m. whenever any key on the keyboard is depressed. The hand set does not have to be lifted for the user to speak to the other party once the party has been dialed and has answered.

AUTODIAL

The autodial subroutine feature allows the user to set up the keyboard terminal to send messages and complete other automatic functions of an ordinary information telephone. Once the autodial subroutine has been accessed by the user the system will then request the telephone number that is to be dialed. After the telephone number has been entered by the user, the system then goes through a question and answer session with the user to set up the appropriate parameters of the autodial feature. The terminal will first ask the user "Name of person you are calling". The user will then answer with a name of up to six characters. If the user does not enter a name the system at the other end gives a general ring. A general ring will also be given by the system on the other end if the name of the party to whom the message is being sent does not exist in the memory of the system at the other end. After the name of the person being called is entered, the system will then ask "Name of message". The user then may respond with a name of up to six characters. If the user does not enter a name, the system does not transmit a message. If the name does not exist in the system's file the system will give a warning "Message name does not exist". The system will then give the user the option of continuing without a message, changing the name of the message or aborting the sequence.

When a user has exercised the above option, the terminal will then ask "Transmission time". The user then responds with the time at which he would like the message to be sent. If no time is given the transmission time is assumed to be immediate. After the transmission time has been entered by the user, the terminal will ask "AUTO REPEAT" (Y or N)". The user will then respond with either a Y or an N to indicate that the call should be repeated or should not be repeated until the call gets through to the desired person. If there is more than one call pending to be transmitted by the system, the system will not go in a loop on one call until all calls that can be completed have been completed.

After the user has responded Y or N the system will then ask "Erase message after transmission (Y or N)." The user then must respond with either a Y or an N to indicate that the message should or should not be erased, that is, the file should be deleted, after the message has been transmitted. The system will determine if there are other calls that need to use that message before the message is erased. After the other calls have used that message, the message will then be erased. After responding Y or N, the system will then ask "Call cost option (Y or N)". The user will then again enter either Y or N to indicate that the user would like the call cost option to be activated at the time the call is made. If there are no cost parameters for call cost residing in memory the system ignores the option at the time the call is made.

AUTOANSWER

Calling the autoanswer feature allows the keyboard to operate in an unattended mode. This option allows the keyboard system to complete certain communication transactions both with and without the use of the operator. Once the user has selected the autoanswer procedure the system will prompt the user with a message "Do you want autoanswer (Y or N)". If the user then enters the letter N, the system puts itself in a standard "Ma-Bell" mode and returns control to the time display. If the user has entered the letter Y the system continues to ask further questions. The next question asked will be "Do you have a message (Y or N)". If the user answers Y, the system goes on to the next question, otherwise it will skip that next question. The system then asks the user "Name of message to be sent". The user then responds to the question with a six character file name. If the file name does not exist in the memory of the system, the system will give an error image. If the party to whom the message is going to be sent has a similar keyboard terminal the message will be sent at the time a call is received. After the appropriate data has been entered the system will ask the user "Disable incoming call (Y or N)". If the user answers with the letter Y, the system will then request the time that calls should be disabled. Finally, the system will ask the user "Disable ring (Y or N)". If the user answers with a Y, the system will then request the time that calls should be disabled. This feature allows incoming messages to be received without disturbing the operator of the terminal.

AUTOMESSAGE

The use of the automessage feature allows a user to give messages to himself. The message can be a single word or an entire page. When the system alerts the user of the message, the user must give a response that he is able to receive that message before the message will actually be transmitted to him. Once the automessage subroutine has been called the system will first ask the user "Name of Message". The user then must respond with the appropriate file name. If the file does not exist, the user will get an error message. After the user has entered the name of the message, the system will then prompt the user with the message "MONTH DAY YEAR 19 HR MIN". The user will then fill in the blanks with the appropriate numerical data and the systems will remind him of that message at the time specified.

VOICE SYNTHESIZER

The use of the voice synthesizer may be tailored for the specialized use of the deaf, the blind or to place emergency calls. If the system is set up for a deaf person and that person receives a call from a non-compatible keyboard terminal unit, the system will respond with the message "The person you have contacted is deaf. To communicate with that person you must have a compatible unit or INPHONE." INPHONE is the designation given to the keyboard terminal 10 as described herein, by the manufacture Novation, Inc.

If the system has been set up to serve the needs of a blind person, the system will have the capability of echoing, that is, speaking the keys which are depressed. This feature can be disabled or enabled from the keyboard. For incoming calls the system will be able to read ASCII coded messages letter by letter or by words if the words exist in the vocabulary of the system and the systems will also speak those letters or words.

The system can also be made to send emergency calls by automatically dialing the number and giving the message "This is an emergency. The person at this end cannot use the phone. The address is (user's applied address). Please hurry." The message will be repeated until the phone is disconnected.

MESSAGE MODE CONTROL

By entering appropriate data the user may select the mode in which the keyboard terminal will be operating. The keyboard may be controlled so as to emulate various types of terminals. If this option is selected by the user, the keyboard will prompt the user with the message "SELECT 1. TWX 2. GE 3. DEAF 4. INPHONE". The user will then enter a number from 1-4 and a carriage return. The system will then be in the selected mode. When the power is first turned on, the system will default to the INPHONE mode.

By selecting the appropriate mode through the keyboard, the system will be able to emulate a TWCX machine with the ability to send and receive messages. If the system is not in the TWX mode, the system may be placed in the GE mode which means that the system may be acting as an interactive terminal to perhaps the General Electric time sharing computer network. If the user has selected the third option the system will be set up in the "deaf" mode and the fourth option allows the system to operate in the normal INPHONE mode. The normal INPHONE mode comprises the various features which are otherwise described herein.

Other commands may also be entered into the system to take advantage of various other features which are offered.

DEAF SIGNALING

This option is selected by entering a command in the following format. DS #1 #2 #3 #4 #5 #6 #7 #8

By selecting this option the system may be caused to turn the lights or other appliances on or off through an appliance control subsystem when a phone call is received at the terminal. This turning on and off of the appliances will continue until the party sending the incoming phone call hangs up or the receiving party answers the phone. After the phone call has been answered, the appliance will stay on. If the phone is not answered, the appliance will stay off. An example of the use of this command would be as follows. DS 1 5 9 6. Such a command would turn on and off the lights or other appliances numbered 1, 5, 9 and 6 upon receiving an incoming phone call. All other appliances would not be affected.

NIGHT LIGHT

The night light feature may be accessed by the user entering a command in the following format. NL #TIME.

When the night light feature has been selected by the user the terminal will turn on a night light when the phone rings. The system will then turn the light off immediately after the sending party hangs up or if the call was never answered, or after a preset time if the call was answered and then the call was completed. Depressing any key on the keyboard during the interval that the phone was disconnected and the passage of TIME seconds will automatically turn off the lights immediately. An example of the use of such a command is as follows. NL 5 15. This command will cause the terminal to turn on light or appliance number 5 when the phone rings and the appliance will be turned off 15 seconds after the phone has been disconnected.

NIGHT SLEEP

This option is selected by entry of a command by the user in the following format NS TIME TIME PRIORITY. Use of this feature will disable the telephone ring between certain times of the night to permit uninterrupted sleep by the user. The user may select up to eight levels of priority. If priority 0 is set, no calls will be allowed through. If priority 1-7 is set, then the person desiring to communicate with the terminal must send a sufficiently high priority code with his message to permit the ringing of the phone at the receiving terminal. An example of the use of this command would be as follows. NS 23:30 06:30 0. This command would dictate that no calls come through to the receiving terminals between the hours of 11:30 p.m. and 6:30 a.m.

AUTOMESSAGE

The user may access the automessage feature by entering a command in the following format AM.

By selecting this feature the terminal will be caused to automatically answer the phone and take any message. This person placing the incoming call can direct the receiving system to signal the user of the receiving system for an audio message. If there is no message from the sending party, the system will assume that it is from a non-compatible system and will ring the bell signaling the user that audio communication is required.

INPHONE STANDARD

The user may place the system in the INPHONE standard mode of operation by entering a command in the following format IS.

By selecting the INPHONE standard feature the system will act as a normal "Ma-Bell" phone with the normal ringing replaced by any of the appropriately selected custom sounds.

ALARM CLOCK

The user may select the alarm clock option by entering a command in the following format AC TIME SOUND #.

By selecting the alarm clock feature the user may set the system to wake the user up at a particular time by means of one of the custom sounds at the specific time. Once the time is set, the system will awaken the user at the same time every day. An example of the use of such command is as follows AC 6:30 2. The foregoing command would cause the system to awaken the user at 6:30 in the morning every day using custom sound number 2.

TIME

No user command is required. A time date calendar will be displayed whenever the system, in is the idle mode and is not doing any other task of consequence. The time and date will be displayed in the following format MMM DD YYY HH: MM CC. An example of a time display would be Jan. 20 1980 8:32 a.m.

SEQUENTIAL CALLING

The user may access the sequential calling subroutine by entering a command in the following format SC TELEPHONE #1 TELEPHONE #2 (AC1, TIME) (AD2, TIME). The use of this feature allows a user of the system to place telephone calls to all numbers between the two specified numbers automatically. This option is particularly useful for people involved in direct marketing who have a particular sales pitch to convey to people in a given geographical area. The following procedural or operational rules apply to the sequential dialing option. (1) If the number dialed is busy, the terminal will skip that number and go on to the next number. (2) The appliance controller will turn on the specified appliance at the specified time after the call is connected. (3) The appliance controller will then turn off the specified appliance at the specified time after the call is connected or when the call is disconnected. This can be anywhere from zero to 999 seconds after the call is connected An example of the use of this command feature is as follows SC 996—5000 996—5999 AC3,0 AD3, 999. If the user should enter this command into the system under the sequential calling option, the terminal will place a telephone call to all the numbers between the telephone numbers 996—5000 and 996—5999. When the first call is connected the system will turn on appliance number 3. When the call is disconnected, appliance number 3 would conveniently be a telephone activated tape recorder which would play the recorded message to the number called.

RANDOM MESSAGE BROADCASTING

Selection of the random message broadcasting feature by the user will cause the keyboard terminal to send a preselected message to a preselected phone number at a preselected time. The system may be commanded to perform this function by entry of a command in the following format RM (TELEPHONE #) (MESSAGE NAME) (DATE/TIME). The system can accommodate many different requests to send messages which are stored in the system at any given time. The messages do not get erased after they are sent. An example of a command which would bring this option into play would be as follows RM 1—213—996—5060 SALES 01/21/80 10:30. This command would cause the message named SALES to be sent to the telephone number indicated on Jan. 21, 1980 at 10:30 a.m.

AUTO REPEAT

Use of this feature causes the keyboard terminal to repeatedly dial a number until the connection is completed or until the phone is lifted off the hook manually. The user may select this feature by entry of a command in the following format. AR TELEPHONE # SOUND #> Use of this feature will allow a user to repeatedly attempt to complete a call to a phone number which is known to be particularly busy. When the number is finally reached, a custom sound is generated to inform the sender of the call that he should pick up his telephone hand set. An example of the use of this feature would be a command as follows AR 1—213—996—5060 5. This command instructs the terminal keyboard to call the 213 area code telephone number until the call is answered. When the telephone call has been answered, custom sound number 5 as prestored in the terminal memory will be sounded at the message sending terminal to indicate to the user of that terminal that the telephone call has been completed to the desired number and that the phone should be picked up. The telephone call will be routed through the speaker of the terminal until the telephone hand set is lifted off the terminal.

BABYSITTER

The use of the babysitter feature commands the keyboard terminal to automatically call a predetermined number when the noise level within a given frequency range reaches a preselected level. The user may access the babysitter function by entry of a command in the following format. BS TELEPHONE #. This feature can be used to place a call to a neighbor's house, such as the user of the system, that, for example, a baby is crying. This feature can also act as a voice sensitive switch to play an emergency telephone call. When the number is called, the hand set is activated so that the person on the other end, that is the person to whom the call is being placed, can hear the message being transmitted. An example of a command in the described format would be as follows BS 996—5060. This command would cause the keyboard to place a call to the entered number whenever the noise level reached a predetermined threshold. This feature may be deactivated by lifting the handset on the keyboard terminal.

REPEAT CALL

The repeat call function of the keyboard terminal may be accessed by the user entering a command in the format RC. Use of this feature will cause the keyboard terminal to attempt completion of a telephone call to the last number that the user of the system called. This feature will not repeat the last number that was called due to some automataic or time dependent feature stored within the system.

SELECTIVE CALL

The user may access the selective call feature of the keyboard terminal by giving a command in the following format SC TELEPHONE # SOUND #. When the modem is installed, this option allows the user's keyboard terminal to call the party at a selected number and, at the other end, ring that system with a selected custom sound to inform the receiving party who the call is from before the phone is answered. If the receiving end is set up to receive this type of call and the caller does not send the appropriate data because he does not have an INPHONE, the phone will still be anwered automatically. However, a general ring will be used instead of the custom ring, and the sender will get back a pre-programmed tone. An example of a command in the above format would be as follows SC 996—5060 4. This command will place a call to telephone number 996—5060 and ring that phone with custom sound number 4.

MESSAGE AND VOICE

The user may select the message and voice option by entering a command in the following format. MV TELEPHONE # MESSAGE SOUND #. Use of this feature will direct the keyboard terminal to dial the indicated telephone number, receive a message if a message exists, transmit a message, and then ring the other party with a selected tone to direct attention to a particular individual at that number. If no transmit message is specified, no ringing at the other end will occur. A custom sound number of zero implies a general ring not directed to any particular person. An example of a command in the above format would be as follows. MV 996—5060 SALES 4. The above command will dial the indicated telephone number and send a message named SALES to that number. After the message is sent, it will ring the phone for voice communication with a selective ring #4 associated with a particular individual at that number. This will inform that particular individual that the system is ready for voice communication.

The description of the above features is intended to illustrate the great versatility of the present invention. While the system has been described with respect to an interconnection of certain pieces of hardware and has been described as controlled by a certain program, it is understood of course that many other features could be added simply by changing the program stored in the erasable programmable read only memories Z12 and Z13. The programs stored in memory could, of course, be custom tailored to fit the needs of particular individuals or otherwise modified to make available features which might be found particularly useful for particular classes of users.

In another embodiment, and now the preferred embodiment, the program for controlling the operation of the microprocessor, as seen by a user, has been written so that the user is not required to memorize, or look up in a reference list, the particular sequence of key depressions to accomplish a particular sequence of key depressions to accomplish a particular operation. Such a system is referred to as a menu driven system. In a menu type program, the user is not required to remember any key depression sequence to enter commands. Instead the user is prompted by the program which presents a decision to the user in the form of a question or selection. The user is then only required to answer the question by choosing among a limited number of possible answers. Each answer may be communicated to the microprocessor by the depression of a corresponding single data entry key. The answers to the questions presented by the program then serve as commands to the microprocessor. Such a program and the operation thereof is explained in Exhibits A & B attached to the application file.

The menu program first asks the user to select the mode in which the user desires to use the data system. After the user selects the desired mode, the program presents other options in the form of questions and similarly requests the user to enter any data required to operate in that mode. The user does nothing but select from available options and provide the required data, so that full operation of all of the features may readily be achieved without any substantial training of the users.

The system as described herein and the features discussed are intended only for purposes of illustration and discussion. It is of course contemplated that many other features could be added and various changes and modifications in the system could be accomplished without departing from the spirit and scope of the invention.

What is claimed is:

1. A self contained portable communication system for coupling to a telephone line comprising:
   a keyboard terminal housing:
   a microprocessor located within said keyboard terminal housing;
   real time means, coupled to said microprocessor;
   a keyboard located on said keyboard terminal housing and having a plurality of alphanumeric data entry keys comprising a full alphanumeric key set in a nonorthogonal typewriter array in communication with said microprocessor;
   memory means located within said key board terminal housing and in communication with said microprocessor for storing a program for controlling the operation of said microprocessor;
   random access memory means in communication with said microprocessor for temporary storage of data;
   telephone line interface means for coupling to a phone line, said telephone line interface means being means for receiving electrical signals from and providing electrical signals to a phone line, including an off hook signal to maintain a phone line connection;
   a telephone handset having a speaker for converting electrical signals to audio signals and a microphone for converting audio signals to electrical signals to be provided to said phone line;
   a one line display means, mounted in said keyboard terminal housing and coupled to said microprocessor;
   at least one appliance control device in communication with said microprocessor and in communication with at least one appliance;
   whereby a user may depress data entry keys to enter data into said random access memory to cause said microprocessor to compute the cost of a telephone call placed through said communication system and to display the total cost on the display at the end of the phone call.

2. The communication system according to claim 1 wherein depression of a preselected set of data entry keys instructs said communication system and said at least one appliance control device to turn said at least one applicance on and off repeatedly upon receipt of an incoming telephone call and to keep said at least one appliance turned on after said call has been answered until the user of said communication system hangs up at which time said at least one applicance is turned off.

3. The communication system of claim 1 wherein depression of any data entry key during a preselected time span of a twenty four hour day will instruct the communication system to place a telephone call to a preselected number.

4. The communication system according to claim 1 further comprising a message recording and playback mechanism, coupled to said microprocessor, whereby user depression of a preselected set of data entry keys will instruct said communication system, between preselected times of the day, to answer incoming calls without ringing and to transmit a preselected message in response to said incoming calls and to receive and store an incoming message.

5. The communication system according to claim 4 wherein depression of a preselected set of data entry keys will instruct said system to automatically dial a preselected telephone number and transmit a preselected message.

6. The communication system according to claim 4 wherein depression of a preselected set of data entry keys will instruct said system to place a telephone call to each telephone number between two preselected numbers and on connection of each call, or on passage of a specified time thereafter, to turn on a preselected appliance, and on passage of a preselected time after connection of the call, or when the call is disconnected, to turn off said preselected appliance.

7. A system comprising first and second communication systems, each having:

a keyboard terminal housing;
a microprocessor located within said keyboard terminal housing:
a real time means coupled to said microprocessor;
a keyboard located on said keyboard terminal housing and having a plurality of alphanumeric data entry keys in communication with said microprocessor;
memory means located within said keyboard terminal housing and in communication with said microprocessor for storing a program for controlling the operation of said microprocessor;
random access memory means in communication with said microprocessor for temporary storage of data;
telephone line interface means for coupling to a phone line, said telephone line interface means being means for receiving electrical signals from and providing electrical signals to a phone line, including an off hook signal to maintain a phone line connection;
a telephone handset having a speaker for converting electrical signals to audio signals and a microphone for converting audio signals to electrical signals to be provided to said phone line;
a one line display means, mounted in said keyboard terminal housing and coupled to said microprocessor; and
a speech synthesizer including a speech synthesizer speaker located within said keyboard terminal housing and in electrical communication with said microprocessor;
whereby depression of a data entry key will enter data to said microprocessor, which data may thereafter be converted by said speech synthesizer to tones of synthesized speech and transmitted over said speech synthesizer speaker;
said first communication system being in communication with said second communication system wherein depression of a preselected set of data entry keys by a user of said first communication system will instruct said first communication system to place a telephone call to a particular person normally present at said second communication system and causes said second communication system to page said particular person by emitting a preselected sound, rather than a normal telephone ring, to inform said particular person that the call is intended for said particular person, and to deliver a preselected message when said call is answered.

8. A self contained communication system comprising:
a keyboard terminal housing;
a microprocessor located within said keyboard terminal housing:
a real time means coupled to said microprocessor;
a keyboard located on said keyboard terminal housing and having a plurality of alphanumeric data entry keys in communication with said microprocessor;
memory means located within said keyboard terminal housing and in communication with said microprocessor for storing a program for controlling the operation of said microprocessor;
random access memory means in communication with said microprocessor for temporary storage of data;
telephone line interface means for coupling to a phone line, said telephone line interface means being means for receiving electrical signal from and providing electrical signals to a phone line, including an off hook signal to maintain a phone line connection;
a telephone handset having a speaker for converting electrical signals to audio signals and a microphone for converting audio signals to electrical signals to be provided to said phone line;
a one line display means, mounted in said keyboard terminal housing and coupled to said microprocessor; and
a speech synthesizer including a speech synthesizer speaker located within said keyboard terminal housing and in electrical communication with said microprocessor;
whereby depression of a data entry key will enter data to said microprocessor, which data may thereafter be converted by said speech synthesizer to tones of synthesized speech and transmitted over said speech synthesizer speaker, and wherein depression of a preselected set of data entry keys will instruct said communication system, between preselected times of the day, to automatically answer incoming telephone calls by transmitting a preselected sound and then terminating the call.

9. A self contained communication system comprising:
a keyboard terminal housing;
a microprocessor located within said keyboard terminal housing:
a real time means coupled to said microprocessor;
a keyboard located on said keyboard terminal housing and having a plurality of alphanumeric data entry keys in communication with said microprocessor;
memory means located within said keyboard terminal housing and in communication with said microprocessor for storing a program for controlling the operation of said microprocessor;
random access memory means in communication with said microprocessor for temporary storage of data;
telephone line interface means for coupling to a phone line, said telephone line interface means being means for receiving electrical signals from and providing electrical signals to a phone line, including an off hook signal to maintain a phone line connection;
a telephone handset having a speaker for converting electrical signals to audio signals and a microphone for converting audio signals to electrical signals to be provided to said phone line;
a one line display means, mounted in said keyboard terminal housing and coupled to said microprocessor; and
a speech synthesizer including a speech synthesizer speaker located within said terminal housing and in electrical communication with said microprocessor;
whereby depression of a data entry key will enter data to said microprocessor, which data may thereafter be converted by said speech synthesizer to tones of synthesized speech and transmitted over said speech synthesizer speaker, and wherein depression of a preselected set of data entry keys will instruct said communication system between preselected times of day to answer incoming calls without ringing and transmit a preselected message to the calling party and to receive and store any incoming message.

10. A self contained communication system comprising:
- a keyboard terminal housing;
- a microprocessor located within said keyboard terminal housing:
- a real time means coupled to said microprocessor;
- a keyboard located on said keyboard terminal housing and having a plurality of alphanumeric data entry keys in communication with said microprocessor;
- memory means located within said keyboard terminal housing and in communication with said microprocessor for storing a program for controlling the operation of said microprocessor;
- random access memory means in communication with said microprocessor for temporary storage of data;
- telephone line interface means for coupling to a phone line, said telephone line interface means being means for receiving electrical signals from and providing electrical signals to a phone line, including an off hook signal to maintain a phone line connection;
- a telephone handset having a speaker for converting electrical signals to audio signals and a microphone for converting audio signals to electrical signals to be provided to said phone line;
- a one line display means, mounted in said keyboard terminal housing and coupled to said microprocessor; and
- a speech synthesizer including a speaker located within said keyboard terminal housing and in electrical communication with said microprocessor;
- whereby depression of a data entry key will enter data to said microprocessor, which data may thereafter be converted by said speech synthesizer to tones of synthesized speech and transmitted over said speech synthesizer speaker; and whereby depression of a preselected set of data entry keys will instruct said system to speak the identity of keys depressed and to also decode and speak coded incoming messages letter by letter or word by word if the words are stored in the said memory means.

11. The communication system according to claim 10 wherein depression of a preselected set of data entry keys will instruct said speech synthesizer speaker of said communication system to emit a preselected combination of sounds at a preselected time so as to awaken the user of said communication system.

12. The communication system according to claim 10 wherein depression of a preselected set of data entry keys will instruct said system to place a telephone call to a preselected number at a preselected time and when said call is completed emit a preselected combination of sounds.

13. The self contained communication system according to claim 10 further comprising a modem coupled to said microprocessor and to said phone line, for converting electrical signals to audio signals to be carried over phone lines through a handset, and for converting audio signals from said handset to electrical signals to be provided to said microprocessor.

14. The communication system according to claim 13 wherein the data transmission rate of said interface means is selectable.

15. The communication system according to claim 13 further comprising a printer device and a means for placing data from said microprocessor into a standard format for transmission over a directed coupled line, whereby depression of a preselected set of data entry keys will direct said system to transmit data to said printer.

16. The communication system according to claim 15 and wherein depression of a preselected sequence of data entry keys will direct said communication system to emulate a data terminal for accessing a time sharing computer system.

17. The communication system according to claim 13 wherein depression of a preselected sequence of data entry keys will direct said communication system to emulate a TWX terminal.

18. The communication system according to claim 13 wherein said display means is a single line liquid crystal display and said computer program presents a menu of operational mode control options on the display for viewing by a user, the options on the menu being displayed sequentially on said display, selection of an option being made by depression of a key representative of a corresponding option on the menu.

* * * * *